US005557347A

United States Patent [19]

Johnson

[11] Patent Number: 5,557,347
[45] Date of Patent: Sep. 17, 1996

[54] BALLISTIC MISSILE BORESIGHT AND INERTIAL TRACKING SYSTEM AND METHOD

[75] Inventor: William M. Johnson, Sudbury, Mass.

[73] Assignee: The Charles Stark Draper Laboratory, Inc., Cambridge, Mass.

[21] Appl. No.: 517,147

[22] Filed: May 1, 1990

Related U.S. Application Data

[63] Continuation-in-part of Ser. No. 927,266, Nov. 4, 1986, abandoned.

[51] Int. Cl.$^6$ ............... G01B 11/26; G01J 1/20; G01C 21/02; B64D 1/04
[52] U.S. Cl. ............... 356/139.08; 250/201.9; 250/206.1; 250/206.2; 89/1.11; 356/141.1; 356/152.1
[58] Field of Search ............... 356/152, 141.1, 356/152.1, 139.08; 89/1.11; 250/206.1, 206.2, 201.9

[56] References Cited

U.S. PATENT DOCUMENTS

| | | | |
|---|---|---|---|
| H,311 | 7/1987 | Jones et al. | 372/9 |
| Re. 31,478 | 12/1983 | McArthur et al. | 219/121 LK |
| 3,799,676 | 3/1974 | Chatterton | 356/152 |
| 3,995,944 | 12/1976 | Queeney | 350/285 |
| 4,063,819 | 12/1977 | Hayes | 356/152 |
| 4,298,798 | 11/1981 | Huffman | 250/423 R |
| 4,517,566 | 5/1985 | Bryant et al. | |
| 4,571,076 | 2/1986 | Johnson | 356/152 |
| 4,576,480 | 3/1986 | Travis | 356/152 |
| 4,580,270 | 4/1986 | Johnson et al. | 372/107 |
| 4,584,161 | 4/1986 | Post, Jr. et al. | 376/143 |
| 4,614,913 | 9/1986 | Honeycutt et al. | 356/152 |
| 4,618,759 | 10/1986 | Muller et al. | 356/152 |
| 4,633,479 | 12/1986 | Trageser | 372/107 |
| 4,684,796 | 8/1987 | Johnson | 250/201 |
| 4,688,086 | 8/1987 | Hutchin | 356/353 |
| 4,700,068 | 10/1987 | McClung, Jr. et al. | 250/251 |
| 4,707,596 | 11/1987 | Hohberg | 250/201 |
| 4,766,393 | 8/1988 | Johnson | 330/4.3 |
| 4,767,209 | 8/1988 | Johnson | 356/152 |
| 4,772,121 | 9/1988 | Trageser | 356/152 |
| 4,773,078 | 9/1988 | Johnson | 372/99 |
| 4,774,473 | 9/1988 | Johnson et al. | 330/4.3 |

OTHER PUBLICATIONS

J. Hecht, Beam Weapons, 1984, Plenum Press, p. 231.
P. Klass, Aviation Week & Space Tech., 24 Aug. 1981, p. 62.
J. Parmentola et al, Scientific American, Apr. 1979, vol. 240, #4, "Particle Beam Weapons".

*Primary Examiner*—Stephen C. Buczinski
*Attorney, Agent, or Firm*—Weingarten, Schurgin, Gagnebin & Hayes

[57] ABSTRACT

A coarse/fine alignment system and method for boresighting high energy, laser pulses onto ballistic missiles in their boost phase. A ground based, common optical aperture laser separator, a mosaic array sensor, and a controller are cooperative to align bursts of light of a ground based laser with a beacon laser of a satellite reciprocally along an uplink therebetween so that the wavelength of the bursts and the wavelength of the beacon laser are the same wavelength. The principle of propagation reciprocity operates to provide ultra high alignment accuracy. Light provided along the reciprocal optical path provides boresight blooming auto-collimation and an ultra high pointing angle resolution. An inertial target tracker provides spacial coordinates and angular rate coordinates of remote targets sited by the tracker. A single mosaic array sensor and associated systems are operative to provide pseudo-star, target spot, and other sensor spots compensated for vibration and other noise phenomena. Shared, sensor spot narrow bandwidth and a common wavelength contribute to a high measure of noise immunity. Beam expander/compressor magnification makes possible ultra high accuracy position and angular rate inertial frame coordinate determinations from the vibrationally stabilized spots of pixel size. A tracker mission mirror controllably aligns a high energy laser light from a destination to a target.

54 Claims, 13 Drawing Sheets

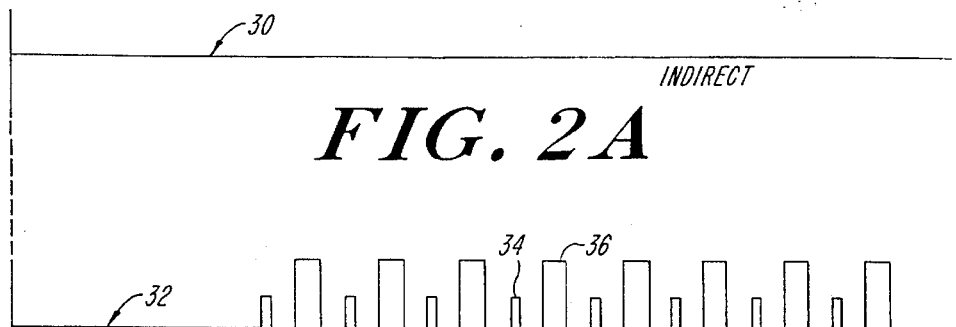
FIG. 2A
FIG. 2B
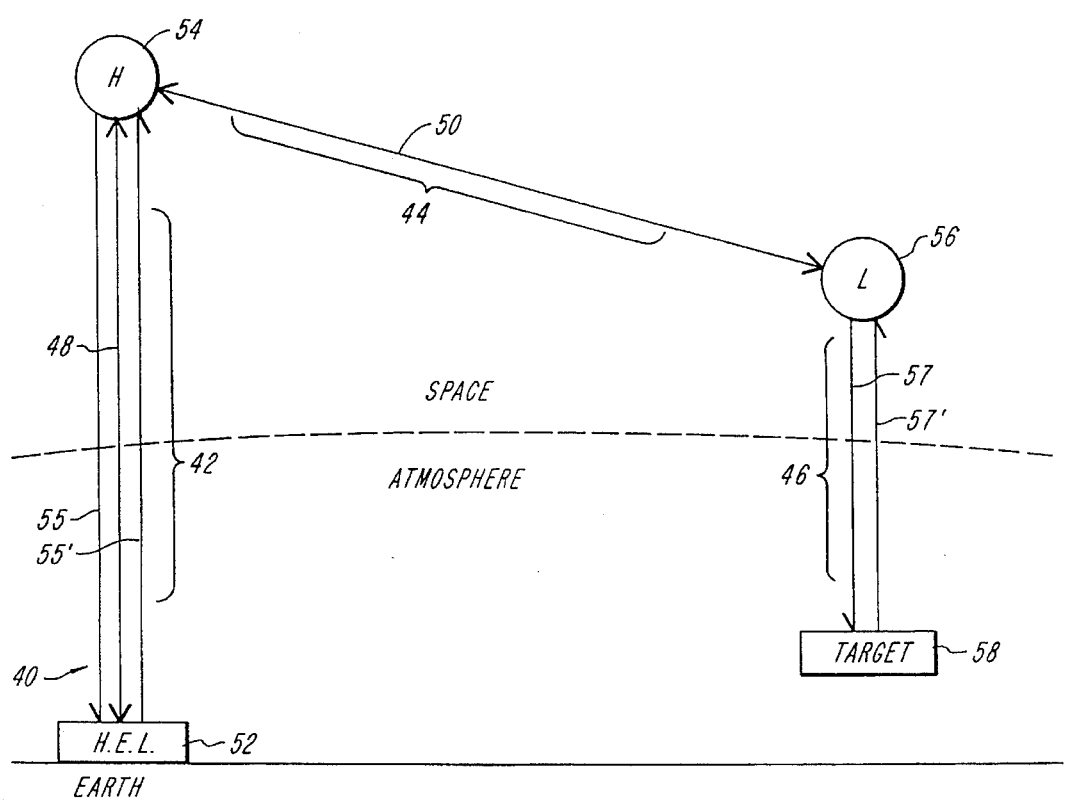
FIG. 3

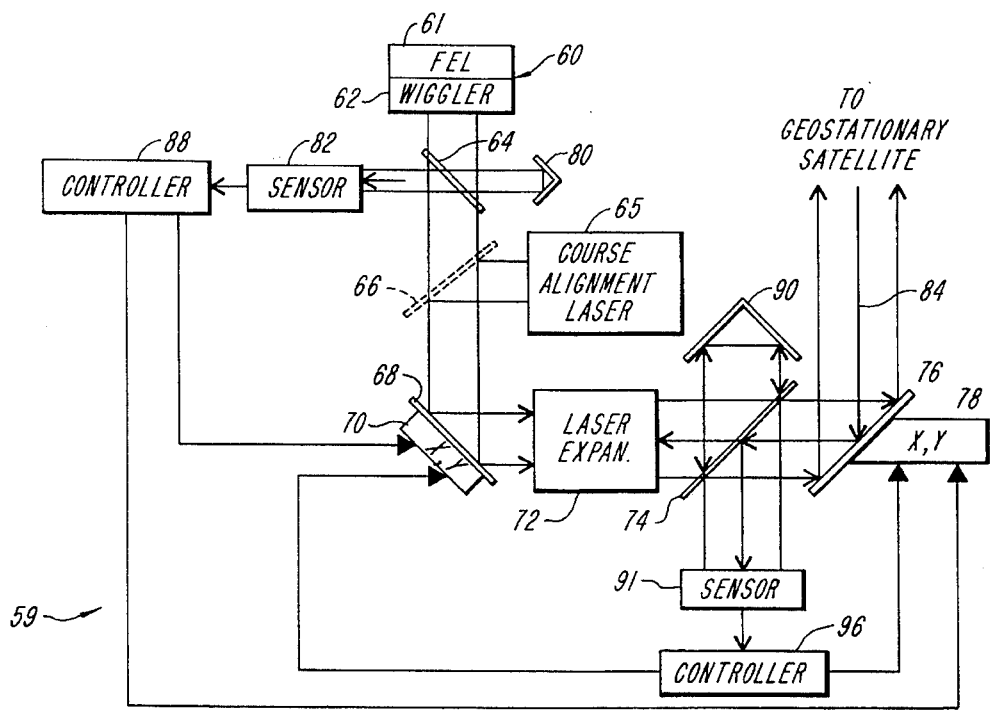
FIG. 4
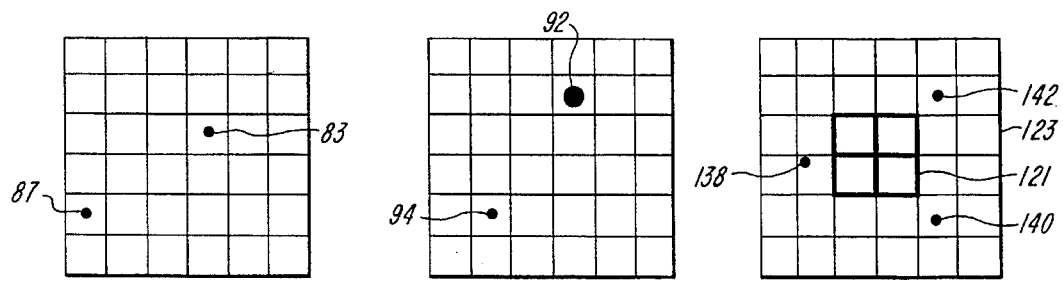
FIG. 5A  FIG. 5B  FIG. 5C

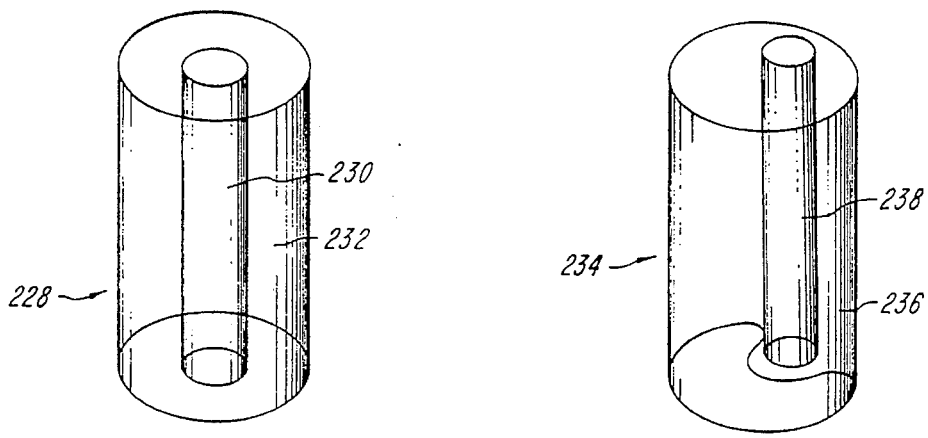
*FIG. 10A*     *FIG. 10B*
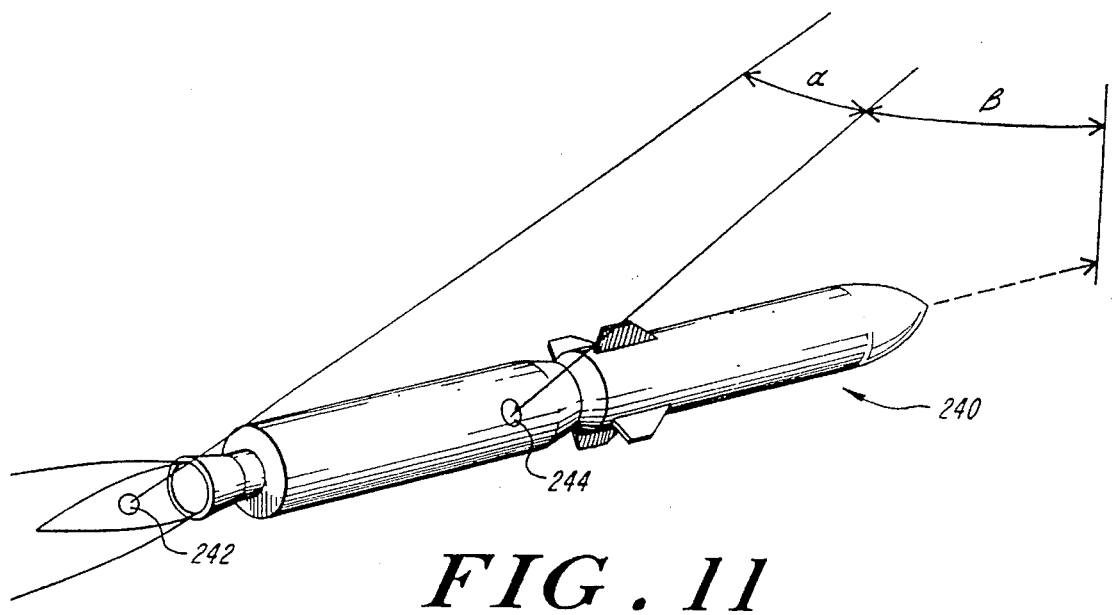
*FIG. 11*

BALLISTIC MISSILE BORESIGHT AND INERTIAL TRACKING SYSTEM AND METHOD

CROSS-REFERENCE TO RELATED APPLICATIONS

The instant invention is a continuation-in-part of allowed, commonly-assigned U.S. patent application Ser. No. 06/927,266, now abandoned, filed Nov. 4, 1986, entitled BALLISTIC MISSILE BORESIGHT AND INERTIAL TRACKING SYSTEM AND METHOD, of the same inventive entity as herein.

1. Field of the Invention

The instant invention is directed to an inertial alignment system and method for boresighting high energy laser pulses onto ballistic missiles in their boost-phase, and for determining in real-time the space-time coordinates of the missiles with respect to inertial space.

2. Background of the Invention

In modern day weapon systems there exists a need to deliver an impact at substantial distances. An example of instrumentation capable of and/or cooperating to provide a targeted high intensity laser beam impact at substantial distances is illustrated in the following patents and/or applications all commonly assigned herewith, and discussed more particularly herein: U.S. Pat. Nos. 4,580,270, and 4,571,076 and U.S. patent application Ser. No. 512,153, now U.S. Pat. Nos. 4,684,796, 512,150, 792,014, now U.S. Pat. Nos. 4,772,121, and 792,057, now U.S. Pat. No. 4,767,209 all incorporated herein by reference. More recently weapons systems have been envisioned to deliver a laser impact between locations that would necessitate relaying of aligned impacting beams via one or more optical relay stations.

SUMMARY OF THE INVENTION

The present invention contemplates as one of its principal objects the boresight alignment of a ground-based high-energy pulsed laser with respect to the vacuum core plume of a ballistic missile during its boost-phase. In accordance therewith, a ballistic missile boresight alignment system and method are disclosed that include coarse and fine alignment subsystems cooperative to deliver the force of high energy laser light onto the structural members of the ballistic missiles with extreme precision. The coarse alignment subsystem continuously provides microradian alignment accuracy between system components, and the fine alignment subsystem provides nanoradian alignment accuracy with respect to the target aim point.

A coarse alignment atmospheric uplink subsystem is operative to establish and maintain the pointing direction of the ground based high energy laser onto a high altitude relay mirror orbiting above the ground based high energy laser. The coarse alignment atmospheric uplink subsystem includes a laser or other beacon source, operatively associated with the high altitude relay mirror, and ground based alignment optics including a common optical aperture reciprocal path laser separator optically coupled to the high energy laser. The separater preferably includes a spinning apertured mirror. The ground based optics are operative in response to the pointing direction of the laser beacon associated with the high altitude relay mirror to guide the outgoing pulses of the high energy laser onto the high altitude relay mirror.

The optical paths of the high-energy pulses and of the laser beacon are substantially reciprocal. The wavelengths of the pulses and of the beacon laser are preferably selected to be equal to the same preselected low-atmospheric-attenuation frequency. The same turbulence and other medium based conditions thereby exist for the beams along the reciprocal uplink atmospheric path through which the high energy laser pulses and laser beacon propagate, so that distortions and other adverse medium-based effects are self-compensating, due to the principle of propagation reciprocity, arid boresight accuracy is therewith obtained.

A coarse alignment spacelink subsystem is operative to establish and maintain the pointing direction of the high altitude relay mirror onto corresponding ones of plural target relay mirrors in low earth orbit as they individually revolve into and out of position over the ballistic missile launch corridor through which ballistic missiles must pass in an earth point to earth point trajectory. The coarse alignment spacelink subsystem is responsive to the pointing direction of a target relay and mirror beacon laser associated with each of the low earth orbit target relay mirror satellites and to the pointing direction of a beacon laser representative of the pointing direction of the ground based high energy laser and is operative to transfer the high-energy laser incident on the high altitude relay mirror onto respective ones of the low earth orbit target relay mirrors as they individually are in position over the launch corridor.

A coarse alignment atmospheric downlink subsystem is operative to establish and maintain the pointing direction of each of the low earth orbit target relay mirrors onto each of the ballistic missiles in their boost phase. The coarse alignment atmospheric downlink subsystem is responsive to the bundle of rays emanating from the vacuum core plume of an in flight ballistic missile and to the beacon laser associated with the high altitude relay mirror satellite to transfer the high energy laser beam incident on the low earth orbit target relay mirror onto the target ballistic missile.

The wavelength of the high energy laser pulses are preferably selected to be equal to the wavelength of the target vacuum core line emission. The high energy pulses and target spectral line emission traverse substantially reciprocal paths. The principle of propagation reciprocity thereby applies, and along the atmospheric downlink, it grants self-cancelling medium-induced distortions ensuring therewith boresight accuracy.

The fine alignment subsystem is operable just after the launch of ballistic missiles to directly boresight the targets. The fine alignment subsystem thereby finely and directly adjusts the boresight accuracy of the indirect alignment substantially continuously maintained by the uplink, spacelink, and downlink coarse alignment subsystems. Just after the launch of the ballistic missiles, the ground based high energy laser is pulsed to provide a precursor beam at an energy level preferably less than its full output power. The precursor pulses thermally excite the atmosphere in such a way as to provide thermal gradients along the uplink and along the downlink having the characteristics of a negative optical lens. The beam of the high altitude beacon laser along the uplink is diverged and distorted by the negative lens of the bloomed atmosphere along the uplink. The bundle of rays emanating from the vacuum core plume is diverged and distorted by the negative lens of the bloomed atmosphere along the downlink. The wavelengths of the outgoing and incoming energy are selected to be the same wavelength, so that the principle of propagation reciprocity applies, and medium effects are self-cancelling along the uplink and along the downlink. The degree of divergence and the manner of distortion are representative of the degree of relative coaxial misalignment of the precursor pulses and high altitude beacon laser along the uplink and of the degree of relative coaxial misalignment of the precursor pulses and the vacuum core plume of the ballistic missiles along the downlink. Real time fine pointing adjustment to a nanoradian precision is thereby obtained, and the ability to deliver full power laser pulses onto the targets with assured lethality is therewith realized.

The present invention contemplates as another object an ultra high resolution inertial tracking system and method for determining position and angular rate of the ballistic missiles with respect to inertial space in real time. In accordance therewith, inertial target trackers are operatively associated with the ground based laser, high altitude satellite, and low earth orbit satellites for determining the position and angular rate coordinates with respect to inertial space respectively of the high altitude satellite, of the corresponding one of the several low earth orbit target relay mirrors, and of the vacuum core plumes of the several ballistic missiles. The earth bound, high altitude, and low earth orbit inertial target trackers respectively include a beam expander having a primary and a secondary reflector for gathering and for providing angular positional magnification of the beacon laser of the high altitude satellite along the atmospheric uplink, the beacon laser of corresponding ones of the low earth orbit target relay mirrors along the spacelink, and of the photon-limited spectrally-narrow emission lines of the vacuum core plumes of the ballistic missiles along the atmospheric downlink. The magnification of the beam expander is such that the apparent position of the target is a multiple of the actual target position so that target spacial coordinate and angular rate projections with respect to inertial space are determinable to a nanoradian accuracy level.

Vibration and other undesirable noise phenomena to which the corresponding inertial target trackers are subject are measured, and are compensated out in real time, to provide high resolution position and angular rate determinations of photon-limited target images free from noise-induced errors. The inertial target trackers each include an inertially stabilized specular member, a low-power laser, a single mosaic array sensor having a multiple-spot tracking capability, and monolithic optics cooperative therewith to deviate the low power laser off of the inertially stabilized specular member onto the mosaic array sensor to provide a bright pseudo-star reference spot thereon. The monolithic optics are operative to deviate the target light gathered by the beam expander onto the mosaic array sensor to provide a target spot thereon. High bandwidth controllers responsive to the bright secondary and pseudo-star reference spots are operative to cancel the effects of vibration and other undesirable noise, and low bandwidth controllers responsive to the position of the stabilized noise-calibrated target spot are operative to compute the position and the angular rate coordinates of the target with respect to inertial space and are operative to control the high power beam. The apertures of the beam expander and monolithic optics, and the pixel element size of the mosaic array sensor, are preferably so selected that the diffraction limited sizes of the target, pseudo-star, and secondary spots are equal to each other and to the size of a pixel element of the mosaic array. In this way, the same sensor is able to be used to simultaneously track several spots. Also, spot centroid location determination accuracy is therewith maximized. The spots have a common wavelength, and are imaged on the same narrow band mosaic sensor. The spectrally narrow mosaic sensor therewith provides a high degree of immunity against background noise. In the preferred embodiment, all possible elements are hard-mounted to the back of the primary reflector of the beam expander and compressor. Those elements not mounted to the primary, i.e. the secondary mirror and the controlled mirrors, are separately calibrated for noise with respect to the primary reflector.

A mission mirror having an optical aperture is associated with each of the inertial trackers for deviating incident light energy onto a targeted object. The mission mirror associated with the inertial tracker of each of the high altitude satellites boresights the ground based high energy laser to the mission mirror associated with the inertial trackers of corresponding ones of the low altitude satellites, the mission mirrors of which, in turn, each deviate the incident light along the atmospheric downlink to the space-time coordinates of the ballistic missles in their boost phases. For each such mission mirror, the associated inertial tracker controllably orientates the mission mirror to effect boresight alignment. The mission mirrors may be bifocal, afocal, and planar, among others. In one embodiment, a controlled member is associated with each of the mission mirrors to provide boresight alignment transfer independantly of the absolute magnitude of the alignment transfer angle through all alignment transfer angles of particable interest.

DETAILED DESCRIPTION OF THE DRAWINGS

Other objects, aspects, and advantages of the present invention will become apparent as the invention becomes better understood by reference to the following solely exemplary and non-limiting detailed description thereof, and to the drawings, whereof:

FIG. 2 illustrates in FIGS. 2A and 2B thereof graphs illustrating the manner of boresight alignment between the ground based high energy laser and each of the target missiles according to the present invention;

FIG. 3 is a schematic pictorial diagram illustrating the manner of boresight alignment along the constitutive uplink, spacelink, and downlink optical paths according to the present invention;

FIG. 4 is a block schematic diagram illustrating one embodiment of the indirect coarse uplink alignment subsystem according to the present invention;

FIG. 5 illustrates in FIGS. 5A, 5B, and 5C thereof sensor plan diagrams useful in illustrating the operation of the coarse indirect uplink alignment subsystem according to the present invention;

FIG. 10 illustrates in FIGS. 10A and 10B thereof pictorial diagrams useful in explaining the direct boresight alignment subsystem according to the present invention;

FIG. 11 is an isometric diagram of a missile illustrating first and second aim point offsets according to the present invention.

DETAILED DESCRIPTION OF THE PREFERRED EMBODIMENTS

Figure 1:
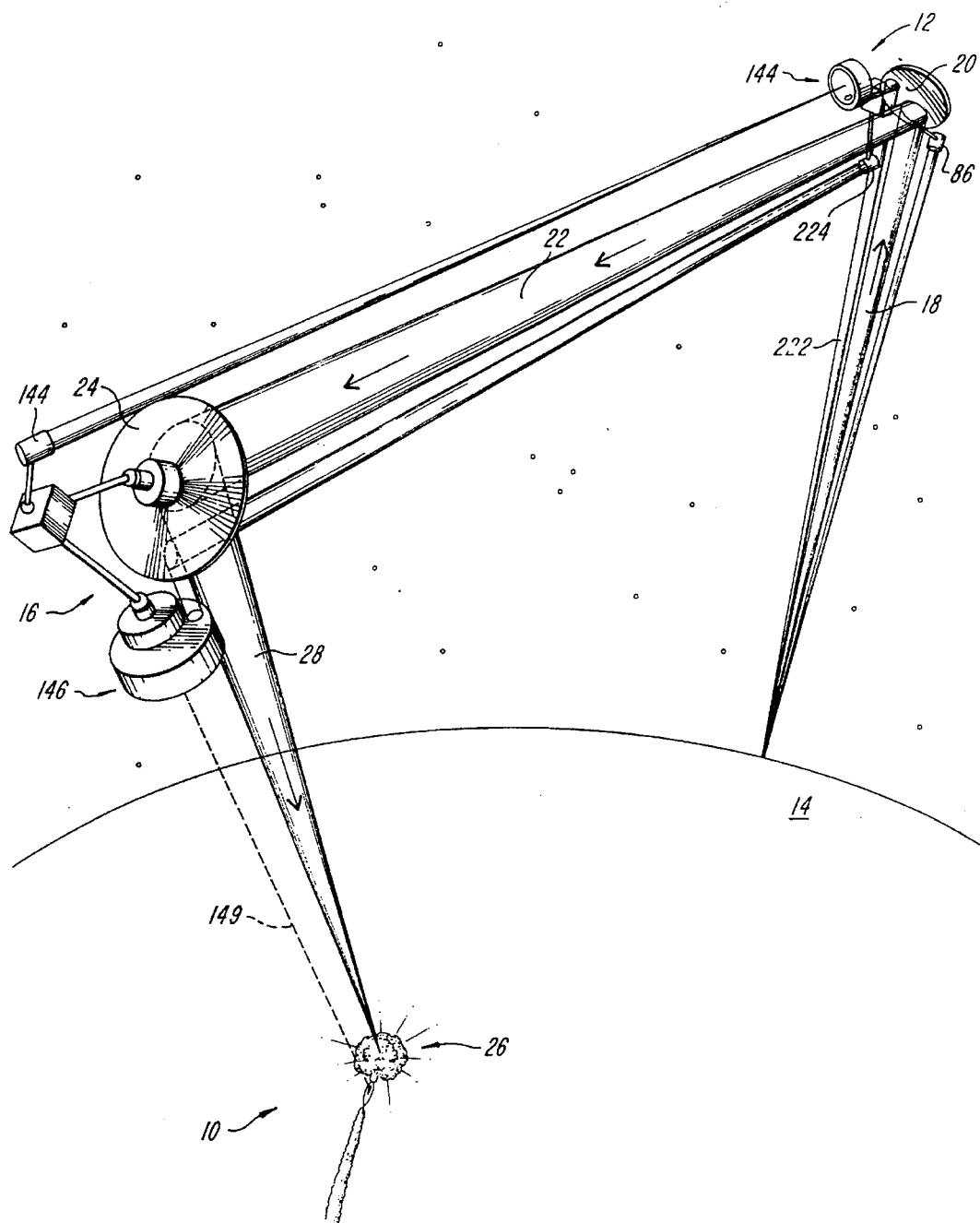
FIG. 1 is a pictorial view useful in explaining the alignment and inertial tracking system and method for boresighting high energy laser pulses onto ballistic missiles in their boost phase and for determining in real time the space time coordinates of the missiles with respect to inertial space according to the present invention.

Referring now to FIG. 1, generally designated at 10 is a pictorial diagram useful in explaining the alignment and inertial tracking system and method for boresighting high energy laser pulses onto ballistic missiles in their boost phase, and for determining in real time the space-time coordinates of the missiles with respect to inertial space according to the present invention. The system 10 includes one or more high altitude satellites generally designated at 12 to be described approximately positioned during long intervals above a ground based high energy laser 14 not visible in the drawing. The satellites 12 track in position and attitude generally above the high energy laser on the earth in a manner well known to those skilled in the art. The one or more high altitude satellites can have geosynchronous, elliptical, and half-synchronous, among other, orbits, without departing from the scope of the invention.

A plurality of target relay satellites generally designated at 16 are in low earth orbit. The low altitude satellites can have circular, elliptical, polar, and non-polar orbits, among others, so selected that the satellites 16 each successively revolve into and out of position over the flight corridor of in flight ballistic missiles, so that there always are satellites in position to intercept a launch. The low earth orbit of the satellites 16 is such that the satellites are proximate to the targets, on the order of several hundreds of miles therefrom, which provides a travel time of the laser light between the target relay mirrors and the missiles that ensures accurate target lock-on and therewith target destruction before the boosters have climbed above the atmosphere.

Boresight alignment is established and continuously maintained between the high altitude satellite 12 and the earth based station, and between the high altitude satellite 12 and each of the several low earth orbit satellites 16 individually confronting the launch corridor, to ensure the perpetual response readiness of the defense system. High energy laser light illustrated by rays 18 is incident on a relay mirror 20 of the high altitude satellite 12 from the ground based high energy laser. The laser light 18 is deviated thereof across space as a beam 22 and onto a mirror 24 associated with the corresponding low earth orbit target relay satellite 16 positioned over the launch corridor. The high altitude relay mirror 20 can be a so-called monocle or single element, as illustrated, but is not limited thereto. The low altitude target relay mirror can be a monocle, as illustrated, or a composite mirror, such as a bifocal mirror assembly or a dual afocal mirror assembly, not shown. Alignment transfer to be described is accomplished using the last reflected beam in the case of other than monocle mirror systems.

A ballistic missile generally designated 26 at a time shortly after its emergence from its silo and well prior to its having climbed above the atmosphere is within the purview of the corresponding low earth orbit target relay satellite 16. The satellite 16 is operative in a manner to be described to determine the spacial position and angular velocity coordinates of the ballistic missile in real time with respect to inertial space. The satellite 16 is operative in response to the inertial determination of the missiles space-time coordinates and to a range parameter handed over to it from an intermediate tracker, not shown, to so angle the mirror 24 as to deviate the beam 22 onto the target 26 compensating for lead angle as shown by a beam 28. In the event of target survival, the inertial position and rate coordinates of the ballistic missile are handed-over to the next layer, not shown, of a multiple-layered architecture for interception and destruction.

Referring now to FIG. 2, generally designated at 30 in FIG. 2A and at 32 in FIG. 2B are graphs illustrating the manner of boresight alignment between the ground based high energy laser and each of the target missiles in accordance with the present invention. The graph 30 designated "indirect" represents that coarse boresight alignment between the earth bound laser and the high altitude satellite and between the high altitude satellite and individual ones of the low earth orbit target relay satellites is always established and maintained without directly viewing the target missiles. The graph 32 designated "direct boresight" represents as a train of pulse-pairs 34,36 that direct boresight alignment of the high energy laser with the target missiles proceeds only if and in the event of an actual launch. Precursor pulses 34 preferably have an energy less than full power of high energy pulses 36, and are emitted in the interpulse intervals of the full power pulses 36 of the high energy laser. The precursor pulses in a manner to be described provide last-minute fine pointing direction control, which ensures that each of the full power pulses are on-target and in-focus to the target missiles.

Referring now to FIG. 3, generally designated at 30 is a schematic pictorial diagram illustrating boresight alignment along the constitutive uplink, spacelink, and downlink optical paths according to the present invention. An atmospheric uplink is designated by a bracket 42, an alignment transfer spacelink is designated by a bracket 44, and an atmospheric downlink is designated by a bracket 46. Double-headed arrows 48,50 respectively provided along the atmospheric uplink 42 and along the alignment transfer spacelink 44 illustrates that indirect boresight alignment is substantially continuously maintained between the earth based laser 52 designated "H.E.L." and the high altitude satellites 54 and the corresponding low earth orbit satellites 56 designated "L" without looking at the target missiles 58 designated "target".

Split arrows designated 55, 55'; 57, 57' respectively along the links 42,46 schematically illustrate the direct boresight alignment according to the present invention. The precursor pulses 34 (FIG. 2B) along the links 42, 46 are illustrated respectively by the arrow halves 55, 57. Along the uplink 42 and along the downlink 46, the precursor pulses 55, 57 respectively traverse common but reciprocal optical paths with a high altitude laser beacon illustrated by the split arrow 55' and with a narrow spectral line emission of the vacuum core plume of the target 58 illustrated by the split arrow 57'. Deviations in the coaxial alignment of the beams 55, 55' and 57, 57' along the atmospheric uplink 42 and atmospheric downlink 46 manifest in a manner to be described as distortion in and position of sensor images to be described of the beams 55', 57'.

Referring now to FIG. 4, generally shown at 59 is a block schematic diagram illustrating one embodiment of an indirect coarse uplink alignment subsystem according to the instant invention. The system 59 includes a ground based high energy laser generally designated 60 for providing very high energy pulses of laser light. The high energy laser preferably includes a free electron laser 61 designated "FEL" and a so-called wiggler 62 cooperative in well-known manner to stimulate an electron lasing medium to emit very high energy pulses of light. The high energy laser pulses are directed through a common optical aperture laser separator 64 to be described and onto a specular member 68. A coarse alignment laser 65 and a beam splitter 66 are provided in the optical path of the high energy laser 60 for performing coarse uplink alignment in a manner to be described. An X, Y tilt actuator 70 is mounted to the rear of the specular member 68. The high power pulses are deviated off the member 68 to a laser expander 72. The expanded high-power pulses traverse a laser separator 74 and, in the preferred embodiment, are incident onto an output mirror 76. The mirror 76 deviates the high-energy light pulses towards the high altitude satellite 12 (FIG. 1). The mirrors 70, 76 can advantageously be the high-heat capacity gyroscopically-stabilized specular members disclosed and claimed in commonly assigned U.S. Pat. No. 4,580,270, entitled HIGH-ENERGY LASER SYSTEM HAVING GYROSCOPICALLY STABILIZED OPTICAL ELEMENTS, incoporated herein by reference.

A portion of the coarse alignment laser 65, and alternately of the high power pulse out of the laser 60, is deviated off the laser separator 64 into a corner cube reflector 80. The reflector 80 deviates it onto a sensor 82 producing a spot 83 representative thereof on the focal plane of the sensor as shown in FIG. 5A. A beacon laser illustrated by an arrow 84, received from a laser beacon 86 (FIG. 1) of the high altitude satellite, is deviated off the mirror 76 through the laser separator 74 and the laser expander 72 off of the mirror 68 and is incident to the laser separator 64, which deviates it onto the sensor 82 producing a spot 87 representative thereof in the focal plane of the sensor as shown in FIG. 5A. A controller 88 is responsive to the centroids of the images 83, 87 on the sensor focal plane the relative positions of which are representative of the outgoing and beacon laser return coaxial misalignment and is operative to provide a coarse alignment control signal to the X, Y tilt actuators 70, 78 to so angle the mirrors 68, 76 that the pointing direction of the outgoing pulses of high energy laser light are aligned with the pointing direction of the geosynchronous beacon laser. The outgoing pulses of high energy laser light are thereby aligned to intercept the relay mirror of the high altitude satellite.

In a further embodiment of the coarse indirect uplink alignment subsystem according to the present invention, a corner cube reflector 90 is provided confronting a mosaic array sensor 91 with the laser separator 74 sandwiched therebetween. The difference between this embodiment and that provided by the elements 64, 80, 82, and 88 described above is the larger scale of the laser separator 74 that accommodates the increased aperture of the wavefronts of the high energy laser pulses as determined by the magnification factor of the laser expander 72. The outgoing pulses, produced in alternate embodiments by the laser 60 and the laser 65, are deviated off of the separator 74 into the reflector 90, which deviates it onto the sensor 91, producing a sensor image 92 representative thereof as illustrated in FIG. 5B. The laser beacon return 84 is deviated onto the sensor 91 via the laser separator 74, producing a sensor image 94 representative thereof as illustrated in FIG. 5B. A controller 96 is responsive to the centroids of the images 92, 94 on the sensor focal plane the positions of which are representative of their relative coaxial misalignment and is operative to provide coarse alignment control signals to the X, Y tilt actuators to so orient the mirrors associated with the actuators that the outgoing pulses are incident on the relay mirror of the high altitude satellite.

In the several embodiments, the laser separators 64, 74 preferably are spinning apertured metallic disks having highly polished specular surfaces as disclosed and claimed in commonly assigned co-pending U.S. patent application Ser. No. 512,153 entitled COMMON OPTICAL APERTURE LASER SEPARATOR FOR RECIPROCAL PATH OPTICAL SYSTEMS, now U.S. Pat. No. 4,684,796, incorporated herein by reference. As the disks are spun, the openings and specular surfaces alternately occupy a common optical aperture. Outgoing light passes unimpeded through the corresponding opening of the disk as the opening rotates into the optical aperture, and the incoming light is deviated off of the corresponding specular surface of the disk as the specular surfaces rotate into the optical aperture.

The term "common optical aperture" designates the site at which the separation of outgoing and incoming laser energy occurs. The common optical aperture makes possible reciprocal travel of and common wavelengths for the outgoing and incoming energy along the same optical path, which are highly desirable performance aspects, insofar as any medium-induced beam distortions and deviations are equally and oppositely produced in this manner on the outgoing and return energy along the uplink and the downlink and in such a way as to be mutually self-cancelling due to the principle of propagation reciprocity. Other laser separators to the extent that they provide a common optical aperture, common wavelengths, a high-power handling capability, a minimum of self-induced damage, and a reciprocal optical path may be employed.

Figure 6:
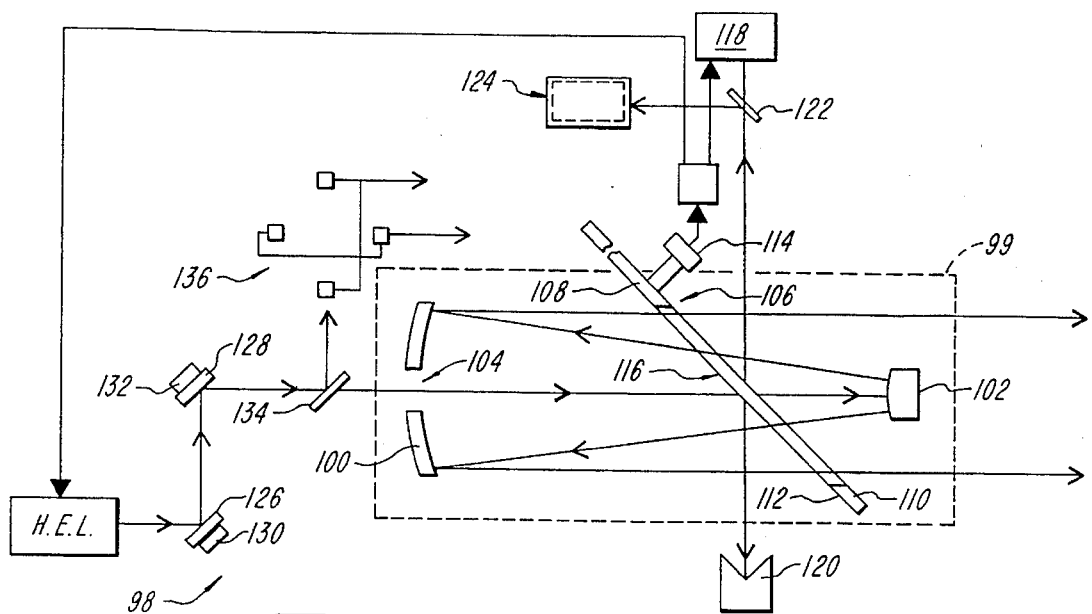
FIG. 6 is a schematic block diagram illustrating a further embodiment of the coarse indirect uplink alignment subsystem according to the present invention.

Referring now to FIG. 6, generally designated at 98 is a schematic block diagram illustrating a further indirect coarse uplink alignment subsystem according to the present invention. A dashed box 99 corresponds to the position of the laser expander (FIG. 4), where the laser pulses are amplified by laser cavity beam expanding mirrors 100, 102 in spaced apart relation therein, and by a lasing medium, such as a flowing gas, not shown, flowing therethrough to provide power amplification. The reflector 100 is provided with a central aperture therethrough generally designated 104. The reflector 102 confronts the reflector 100 and is dimensioned to be in the shadow of and to be at least as large as the aperture 104 of the reflector 100. The relative dimensions and spacings of the reflectors 100, 102 are selected to provide an intended cavity magnification.

A common optical aperture laser separator generally designated 106 is provided intermediate the reflectors 100, 102 for separating optical energy along a common optical aperture. The laser separator 106 preferably includes a metallic disk 108 having polished specular surfaces 110, 112 that is mounted for rotation with the shaft of the motor 114. The disk 108 includes at least one aperture generally designated 116 therethrough. As the disk 108 rotates, the apertures 116 thereof are aligned with the axis of the beam amplifier and expander. For some angular orientations thereof, the reflecting surfaces 110, 112 are aligned with the axis of the beam amplifier and expander. Reference may be had to the above-identified and incorporated cognate U.S. patent application, for a further description of the laser separator.

An alignment laser 118 and a confronting extended corner cube reflector 120 are provided transverse the axis and to either side of the disk 108. The alignment laser may be any suitable CW or pulsed laser device. A beam splitter 122 is positioned along the path of the alignment laser 118 to deviate light present therealong onto a sensor generally designated 124. The sensor 124 preferably includes a central quad cell 121 superimposed on a mosaic array 123 as illustrated in FIG. 5C and as disclosed and claimed in co-pending commonly assigned U.S. patent application entitled LIMITED DIFFRACTION FEEDBACK LASER SYSTEM HAVING A COMPOSITE SENSOR, Ser. No. 512,150, incorporated herein by reference.

Relay mirrors 126, 128 are positioned in spaced relation along the optical path of entering light pulses, and two degree of freedom X, Y tilt actuators 130, 132 respectively are mounted to the backs of the relay mirrors 126, 128 for controlling their azimuthal and elevational pointing direction. A beam splitter 134 is provided intermediate the relay mirror 128 and the reflector 100 and along the axis. A plurality of centering sensors schematically illustrated generally at 136 to be described are provided to maintain the pulsed laser beam aligned with the aperture 104 of the reflector 100 so that it enters the beam amplifier and expander along the axis thereof.

During the interpulse intervals of successive outgoing pulses of high energy laser light in alternative embodiments produced by the high energy laser source 60 and the laser 65 (FIG. 4), and synchronous with the alignment of the reflecting surfaces of the laser separator 106 with the axis of the beam amplifier and expander, the pulsed laser light is deviated off the reflecting surface 112 of the laser separator 106 and onto the extended corner cube reflector 120. The reflector 120 deviates the laser energy onto the beam splitter 122 from which a portion thereof is deviated onto the sensor 124. In response to any spatial dislocations off optical null in the position of the laser energy centroid, the quad cell of the sensor 126 provides a signal representative of the internal misalignment of the high energy laser with the axis. A control signal, not shown, responsive to the off-null misalignment signal is applied to the X, Y actuator 130 of the relay mirror 126 to maintain the pulsed high-energy laser internally aligned with the axis of the beam expander.

The splitter 134 deviates a portion of the laser energy onto the centering sensor array 136. The array is shown in the plane of the figure for ease of representation, but it will be appreciated that it is located in a plane perpendicular to the plane of the figure. The two sensors thereof disposed about the horizontal direction of the figure are operative to provide a signal representative of the relative azimuthal position of the laser beam, and the sensors thereof disposed about the vertical direction are operative to provide a signal representative of the relative elevational position of the laser beam. A control signal, not shown, responsive to the centering array sensor signals is applied to the X, Y actuator 132 of the relay mirror 128 to maintain the laser beam externally aligned with the beam amplifier and expander axis and centered at the aperture 104 of the mirror 100. The relay mirrors 126, 128 establish and maintain the coaxial alignment of the pulsed high energy laser with the beam amplifier and expander.

During the interpulse intervals of successive outgoing pulses and synchronous with the alignment of the reflecting surface 110 of the separator 106 about the common optical aperture, the beacon laser 84 (FIG. 4) of the high altitude satellite is deviated off of member 76 (FIG. 4), and onto the reflecting surface 110 of the disk 108. The beacon laser is deviated therefrom onto the beam splitter 122, which deviates it onto the array 124 producing a spot 138 thereon as shown in FIG. 5C.

At times synchronous with the alignment of the reflecting surfaces 110, 112 of the separator 106 with the optical axis of the beam amplifier and expander and during the interpulse intervals of successive pulses of outgoing laser light, the beam of the alignment laser 118 is deviated off the reflecting surface 110 onto the mirror 102, and back therefrom off the same reflecting surface to the beam splitter 122. The splitter 122 deviates it onto the sensor 124 producing a spot 140 representative of the pointing direction of the mirror 102 as shown in FIG. 5C.

Another portion of the alignment laser during the interpulse intervals is deviated off the extended corner cube reflector 120 onto the reflecting surface 112 of the laser separator 106, and from there onto the concave reflector 100. It is reflected back therefrom back against the reflecting surface and back through the extended corner cube reflector and onto the beam splitter 122. The splitter 122 deviates the beam on the sensor 124 producing an image 142 representative of the pointing direction of the concave mirror as shown in FIG. 5C. The centroids, and sizes, of the spots 138, 140, 142 represent the relative coaxial misalignment of the outgoing pulses of high energy laser light and the high altitude beacon return energy, and either the X, Y actuator 70 or the X, Y actuator 78 (FIG. 4) can be tilted in azimuth and in elevation to correct for the deviation.

Figure 7:
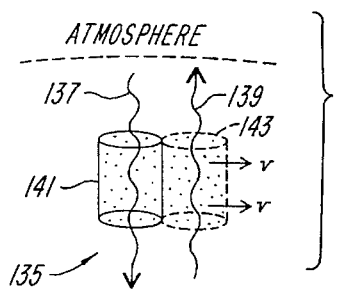
FIG. 7 is a pictorial diagram useful in explaining the coarse uplink subsystem of the present invention.

Referring now to FIG. 7, generally designated at 135 is a pictorial diagram illustrating the reciprocal path through the atmosphere of any of the coarse indirect uplink alignment subsystem embodiments of the present invention. The laser beacon illustrated by a downwardly pointed arrow 137 and the outgoing pulses illustrated by an upwardly pointing arrow 139 are offset with preselected aim point lead angles selected such that the outgoing and incoming energy, taking into account the propagation velocities and distances, traverse the same column of atmosphere that is moving with a velocity "v", as is illustrated by a column 141 and a column 143 displaced from but the same as the column 141. Along the atmospheric downlink the outgoing and return energy traverse substantially the same optical path reciprocally, due to the short propagation delay and short physical distances between the target relay satellite and the target. The aim point lead angle is implemented in a fashion similar to that for the uplink.

Returning now briefly to FIG. 1, an inertial target tracker generally designated 144 is associated with each of one or more high altitude satellites 12, an inertial target tracker generally designated 146 is associated with each of the low earth orbit target satellites 16 and an inertial target tracker, not shown, is associated with the ground based laser on the earth 14. The inertial target trackers severally provide target boresight and tracking respectively along the uplink, spacelink, and downlink portions of the optical path between the earth bound free electron laser and the ballistic missiles in their boost phase. Each inertial target tracker respectively sights and tracks the high altitude satellite laser beacon 86, a corresponding low earth orbit target relay satellite laser beacon 147, and the photon-limited and spectrally narrow line emission of the vacuum core plume of the missile 26 as illustrated by a dashed line 149. The inertial target trackers are operative to provide respective target position and angular rate projections, with a resolution accuracy on the order of a nanoradian and in the inertial coordinate frame of the target. Each of the inertial trackers has associated therewith a mission mirror, like the monocles 20, 24, (FIG. 1), each having an optical aperture, and are operative to controllably orient the associated mission mirror to effect boresight alignment of incoming optical energy incident to the optical aperture onto their respective target objects and through any alignment transfer angle defined between the vector representative of the incoming energy and the vector representative of the projected space-time coordinates with respect to inertial space of their corresponding target objects.

Referring now to FIG. 8, FIG. 8A through 8G thereof are partially sectional partially pictorial views of the inertial target tracker of the present invention individually illustrating corresponding ones of plural constitutive controllers generally designated respectively at 148, 150, 152, 154, 156, 158, and 229 cooperative to provide an inertial sighting, tracking and boresight transfer alignment function.

As shown in FIG. 8, the inertial target trackers each include a beam expander generally designated 160. The beam expander 160 includes a concave, centrally apertured reflector 162 with its specular surface facing the targeted object to the top of the page of the drawings, not shown. A comparatively smaller convex reflector 164, spaced from and axially positioned centrally with respect to the primary reflector 162, deviates light gathered from the targeted object by the reflector 162 through the central aperture generally designated 166 thereof. The beam compressor 160 has a preselected magnification, M, as determined by the relative sizes of the members 162, 164. Target position and target angular rate in inertial target space are determined in magnified sensor space with a resolution that is enhanced by the magnification of the beam expander/compressor 160.

Optics generally designated 168 are provided to the back of the primary reflector 162 of the beam expander 160. The optics 168 include beam splitters 170, 172 that are provided in spaced-apart relation confronting the beam splitter 170. A mirror 176, and a splitter 178 are provided spaced to either side of the splitter 172. The optics 168 preferably are fabricated as a monolithic optical assembly generally designated 180 in FIG. 9. The several optical elements 170–178 are respectively provided along the corresponding interface or surface of prisms 182 fastened in the manner illustrated. A focusing lens 184, and convex, concave collimating lenses 186, 188 (FIG. 9), are provided to compensate for the divergence and convergence introduced by the curvature of the mirrors 162, 164 (FIG. 8) of the beam expander 160. The optics 168 provides optical paths to be described for providing boresight alignment, alignment transfer and inertial target tracking. Reference may be had to commonly-assigned co-pending U.S. patent application entitled "MOVEMENT AND FOCUS CONTROL SYSTEM FOR A HIGH-ENERGY LASER", Ser. No. 792,014, now U.S. Pat. No. 4,772,121, incorporated herein by reference, for a further description of the movement, focusing and the curvature compensation provided by the lenses 184, 188.

Vibration and other noise in the environment disturb the inertial tracker and produce errors in determining the space-time coordinates of the target objects as well as limit the resolution with which the position and angular rate of the objects are determinable. To compensate the inertial target trackers for noise in accordance with the present invention, the secondary reflector 164 is stabilized with respect to the primary reflector 162, and the primary reflector 162, and therewith the monolithic optical element 168 rigidly fastened thereto, are stabilized with respect to inertial space. Elements not part of the monolithic optical element 168 are separately compensated. The noise-stabilized inertial target tracker is thereby capable of providing very-high-resolution position and angular rate determinations with an acceptable error figure.

An alignment laser 190 confronting the secondary reflector 164 provides a cw or pulsed beam that traverses an optical path through the beam splitting elements 170,172 and through the central opening 166 of the primary reflector 162. The alignment laser 190 is mounted rigidly with respect to the optical element 180 (FIG. 9) by any suitable means, as, for example, on a common optical bench, not shown, fastened rigidly to the back of the primary reflector 162, upon which the element 180 (FIG. 9) may also be mounted.

A sensor 192 is provided in spaced-apart confronting relation to the mirror 178. The sensor is mounted rigidly with respect to the element 180, by any suitable means, as on the same common optical bench. The sensor 192 preferably includes a central high bandwidth quad cell centrally mounted in all extended mosaic array sensor. The quad cell can be either separately hard-wired, or specific elements of the mosaic array sensor can be dedicated to the quad cell function. Reference in this connection may be had to commonly-assigned co-pending U.S. patent application Ser. No. 792,057, now U.S. Pat. No. 4,767,290, entitled "LIMITED DIFFRACTION FEEDBACK LASER SYSTEM HAVING A COMPOSITE SENSOR," incorporated herein by reference.

The sensor 192 has a multiple spot tracking capability. Reference in this connection may be had to commonly assigned U.S. Pat. No. 4,910,596, by Kieft, entitled HIGH BANDWIDTH PLURAL SPOT VIDEO PROCESSOR, incorporated herein by reference. The several spots imaged thereon to be described are selected to have a common wavelength. The sensor 192 is preferably selected to have a spectrally narrowband response tuned about the common wavelength of the several spots so that it thereby exhibits a highly desirable background noise rejection characteristic.

Figure 8A:
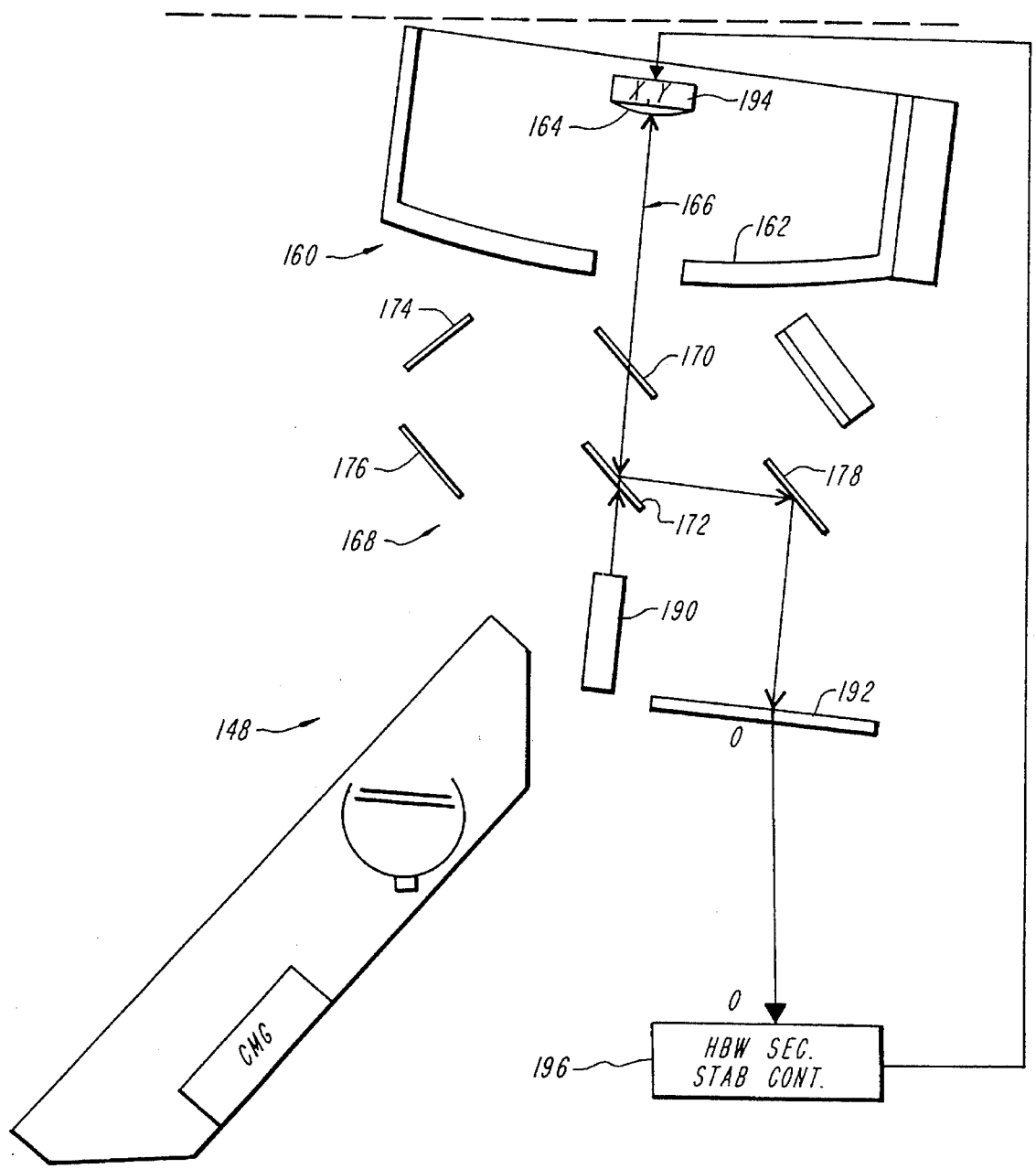
FIG. 8 illustrates in FIGS. 8A through 8G thereof partially sectioned and partially pictorial views individually illustrating corresponding ones of constitutive controllers cooperative to provide ultra high angular resolution inertial tracking according to the present invention.

FIG. 8A illustrates the presently preferred embodiment of the secondary reflector stabilization controller. The secondary reflector is mounted to the beam expander 160 via spider struts that are flexible in the nanoradian world, so that the secondary reflector must be compensated for undesirable dislocation. An X,Y actuator 194 is mounted to the back of the secondary reflector 164. A high-bandwidth secondary stabilization controller 196 is connected between the output of the quad cell of the sensor 192 and the input of the X,Y tilt actuator 194 fastened to the rear of the secondary reflector 164. The output beam produced by the alignment laser 190 illuminates the secondary reflector 164 of the beam expander 160. The energy is deviated back thereoff, and is incident on the splitter 172. The splitter 172 deviates a portion thereof onto the specular member 178, which in turn deviates it into the sensor 192. Deviation off optical null in the image of the secondary reflector on the sensor thus represents the motion of the secondary reflector with respect to the primary assembly induced by vibration and other noise effects. The controller 196 responds to the deviation of the image of the secondary mirror off optical null and provides a tilt control signal to the actuator 194. The actuator 194 so moves in response to the tilt control signal that the image of the secondary is returned to optical null. Vibration and other noise effects of the secondary reflector with respect to the primary reflector are thereby substantially compensated.

Figure 9:
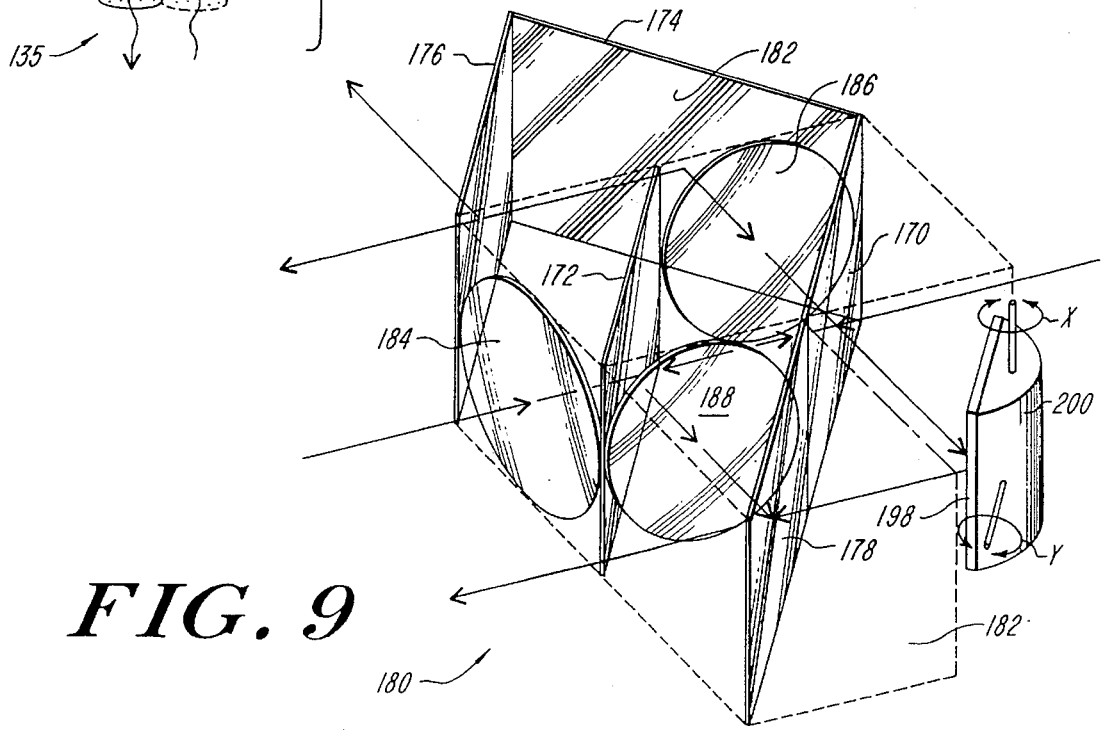
FIG. 9 is a perspective view illustrating a monolithic optical assembly of the present invention.
Figure 8B:
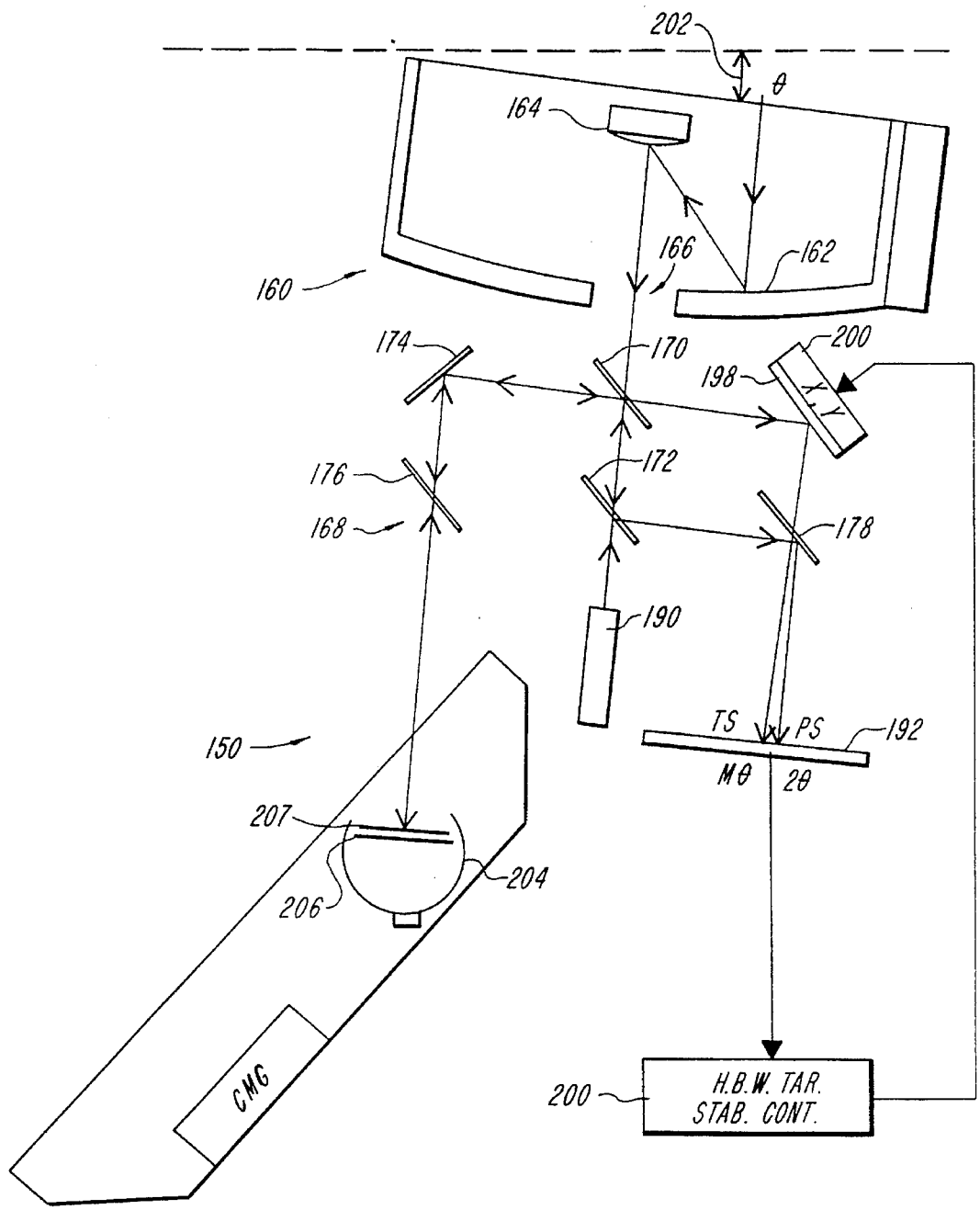

FIG. 8B illustrates the presently preferred embodiment of the primary assembly stabilization controller of the present invention. The primary assembly is subject to dislocations in the nanoradian world, which are compensated with respect to inertial space. As best seen in FIG. 9, a specular member 198 having an X, Y tilt actuator 200 mounted to the back thereof is positioned confronting the splitters 170, 178. An angle 202 designated "θ" represents a vibrationably induced dislocation in the position of the beam expander primary assembly with respect to inertial space. An input target sighted through the beam expander is dislocated "Mθ" with respect to inertial space, where "M" is the preselected magnification of the beam expander 160. In the presently preferred embodiment, the magnification is selected to be on the order of one hundred. The target light reflected off the elements of the beam expander passes through the central aperture 166 of the primary reflector, and the elements 170, 172, 178, and 184 (FIG. 9) deviate and focus it on the focal plane of the sensor 192, producing an image designated "TS" thereon. An inertial reference unit 204 (IRU) includes a platform 206 magnetically suspended therein in such a way that the platform 206 is at rest with respect to absolute inertial space. A mirror 207 is mounted to the platform 206. Like the stars, the IRU platform and mirror normal are at rest with respect to absolute inertial space and constitute a star-like, i.e. a pseudo-star, reference.

The splitters 172, 170, 176 and the specular member 174 deviate the beam of the alignment laser 190 onto the pseudo-star reference mirror 207. The alignment beam is deviated off the inertially-stabilized mirror 207 through the splitter 176, and is reflected back off the reflect or 174 onto the beam splitter 170. The splitter 170 passes it onto the specular member 198, which deviates it through the splitter 178 onto the sensor 192 producing an image thereof designated "PS" on the focal plane thereof. The "PS" spot acts as a star-like body.

Any vibration (θ) and other noise to which the primary reflector and assembly attached thereto is subject affects the positions of the TS spot and of the PS spot images on the sensor 192. The optical path of the alignment laser includes the pseudo-star reference. The tilt error θ of the platform with respect to inertial space is isolatable by reference to the pseudo-star spot on the sensor 192. For θ degrees of platform error the pseudo-star spot moves 2θ degrees.

A high bandwidth primary stabilization controller 200, connected between the output of the sensor 192 and the input of the X, Y actuator 200 mounted to the rear of the mirror 198, is responsive to the image motion (2θ) of the pseudo-star spot PS on the sensor 192 to drive the X, Y actuator 200 in real-time by an amount equal to the quantity Mθ/2. The resulting movement of the mirror 198 exactly compensates the primary assembly vibration with respect to inertial space, and therewith, the image TS of the target spot is stabilized against vibration on the mosaic sensor. Control and other error sources in the actuator 200 itself are automatically corrected in a manner to be described.

Figure 8C:
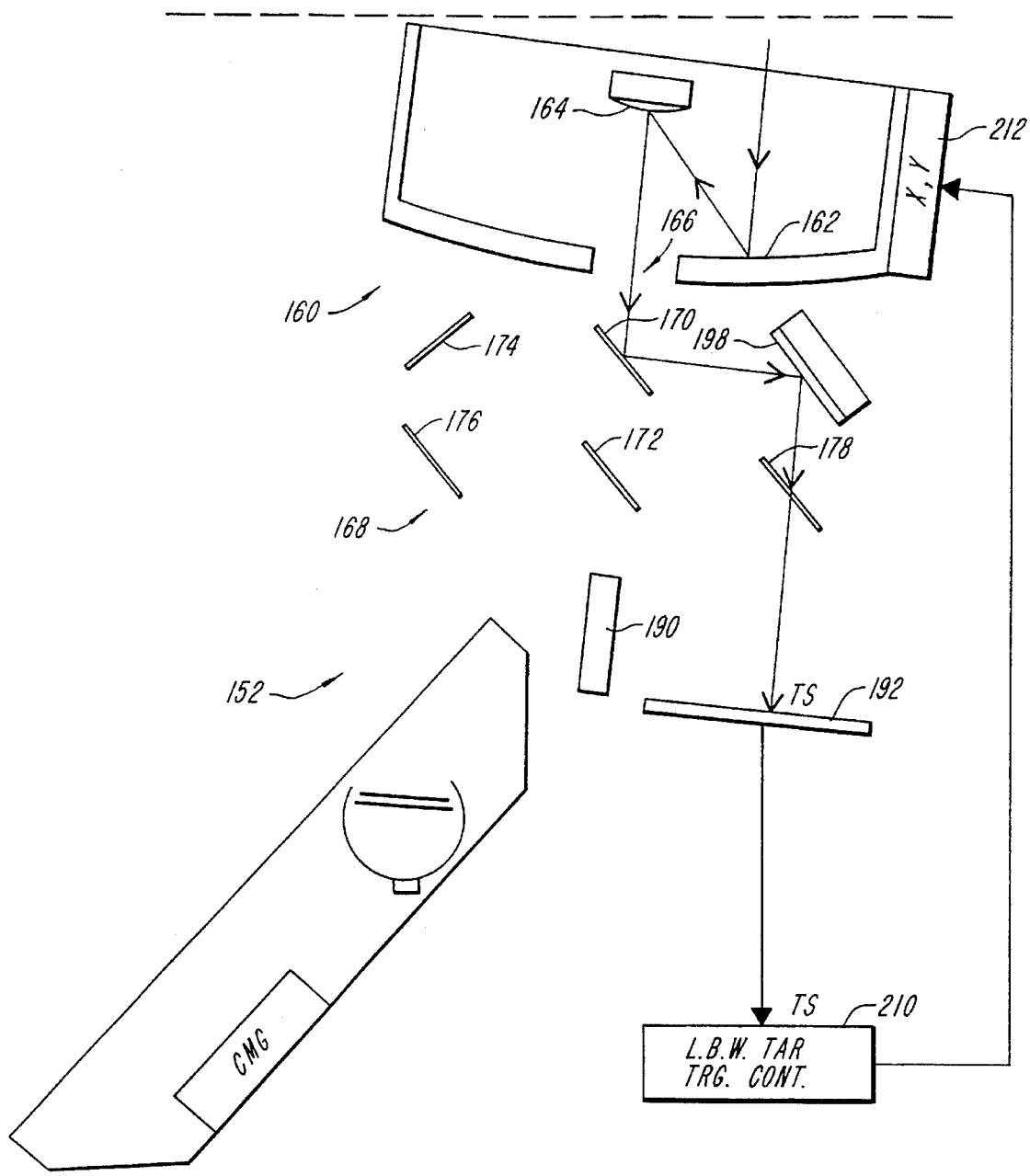

FIG. 8C illustrates a low bandwidth target spot stabilization controller of the inertial target tracker. In the case of the inertial target tracker 146 (FIG. 1) photon-limited target light is imaged onto the focal plane of the sensor 192, via the elements 162, 164, 170, 198, and 178, producing an image spot thereof designated "TS" on the sensor 192. A low bandwidth target tracking controller 210 is connected between the output of the sensor 192 and the input of an X, Y tilt actuator 212 mounted to the primary reflector assembly of the beam expander 160.

With the movement of the target in inertial space, whether the vacuum core plume of a ballistic missile as viewed by the inertial target tracker of the corresponding low earth orbit satellite, the low earth orbit target relay beacon laser as viewed by the inertial target tracker of the high altitude satellite, or the high altitude beacon laser as viewed by the earth based inertial target tracker, the image thereof on the respective vibration compensated sensor 192 moves in a corresponding manner. The controller 210 is operative to apply an image stabilization control signal to the actuator 212 in response to the movement of the target spot on the sensor. The actuator 212 in response to the image stabilization control signal so moves the expander/compressor 160 that it angularly sweeps at a rate that corresponds to the angular rate of the target. The beam expander of the high altitude satellite inertial target tracker is thereby made to follow the movement of the corresponding low earth orbit relay satellites as they successively move into, over, and out of the launch corridor, the beam expander of the low earth orbit target relay satellite inertial target tracker is made to follow the path of the ballistic missiles as they climb through the atmosphere, and the earth based inertial target tracker similarly follows any movement of the high altitude satellite. The corresponding target image spots are therewith stabilized on the corresponding sensors. The stabilization against motion thus obtained enables the mosaic array sensor to provide very precise sub-pixel position determinations and thereby high resolution target coordinate and rate determinations with respect to inertial space.

Figure 8D:
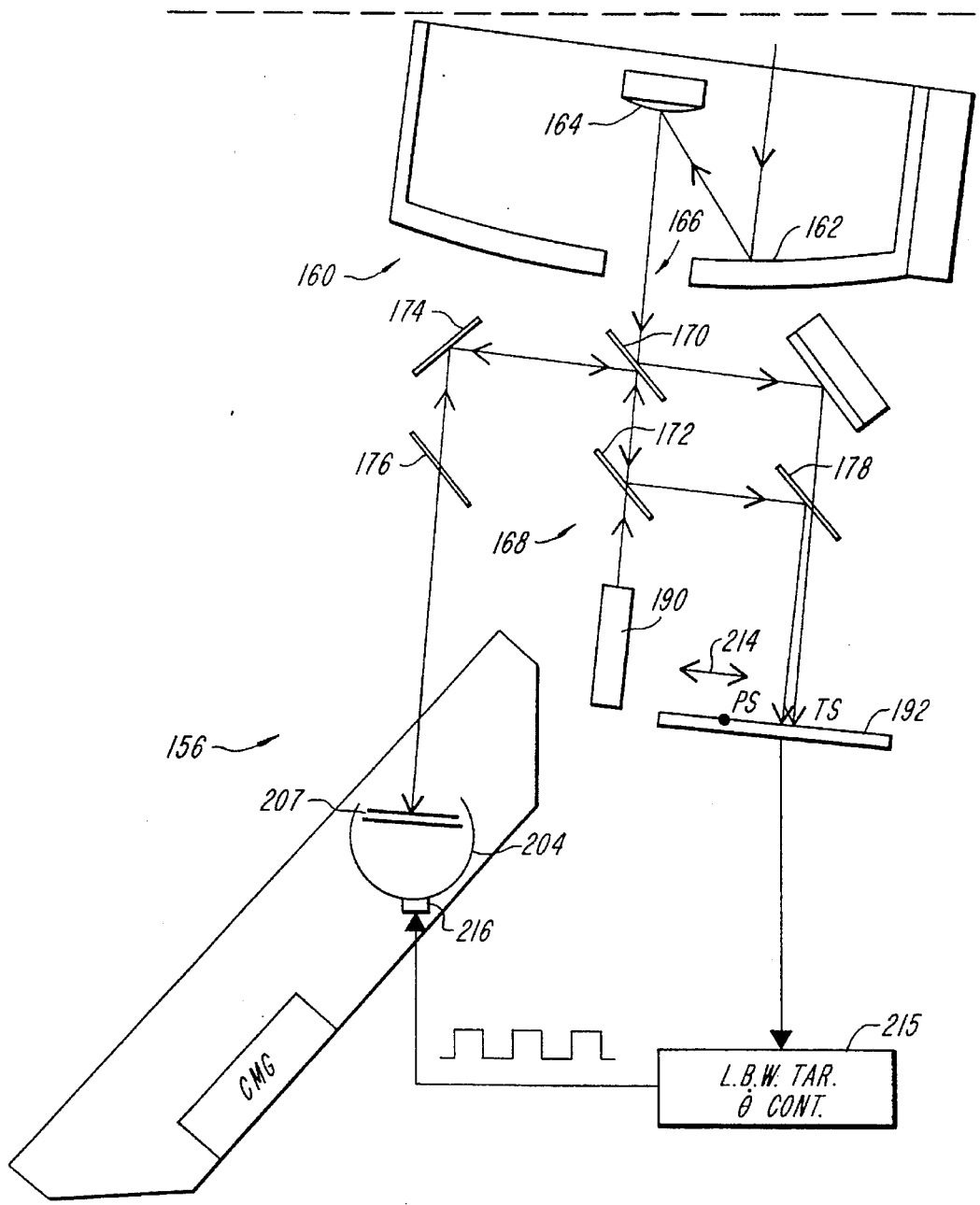

FIG. 8D illustrates a tracking controller of the inertial target tracker according to the present invention. As described above in connection with the description of FIG. 8C, the beam expander/compressor 160 and the assembly rigidly attached thereto are moved by the controller 210 to exactly track the target. The target spot designated TS is imaged and vibration-stabilized on the sensor 192 in the manner described above in connection with the description of FIG. 8B.

As illustrated by an arrow 214, the pseudo-star spot moves about the focal plane of the sensor 192 in response to the movement of the beam expander 160 as it tracks the target, since the pseudo-star mirror 207 is at rest with respect to inertial space. A low bandwidth target angular rate controller 215 is connected between the output of the sensor 192 and a pulse-torque input 216 of the IRU 204. The controller 215 is responsive to the changing position of the centroid of the energy of the pseudo-star spot image on the sensor 192 to so pulse-torque the platform 206 of the inertial reference unit 204 that the specular member 207 thereof moves in such a way that the pseudo-star spot on the sensor is caused to be stationary, by tracking the target spot which is kept stationary thereon in the manner described. The particular frequency of the pulse train applied to stabilize the PS spot is representative of the actual target angular rate in inertial space.

Figure 8E:
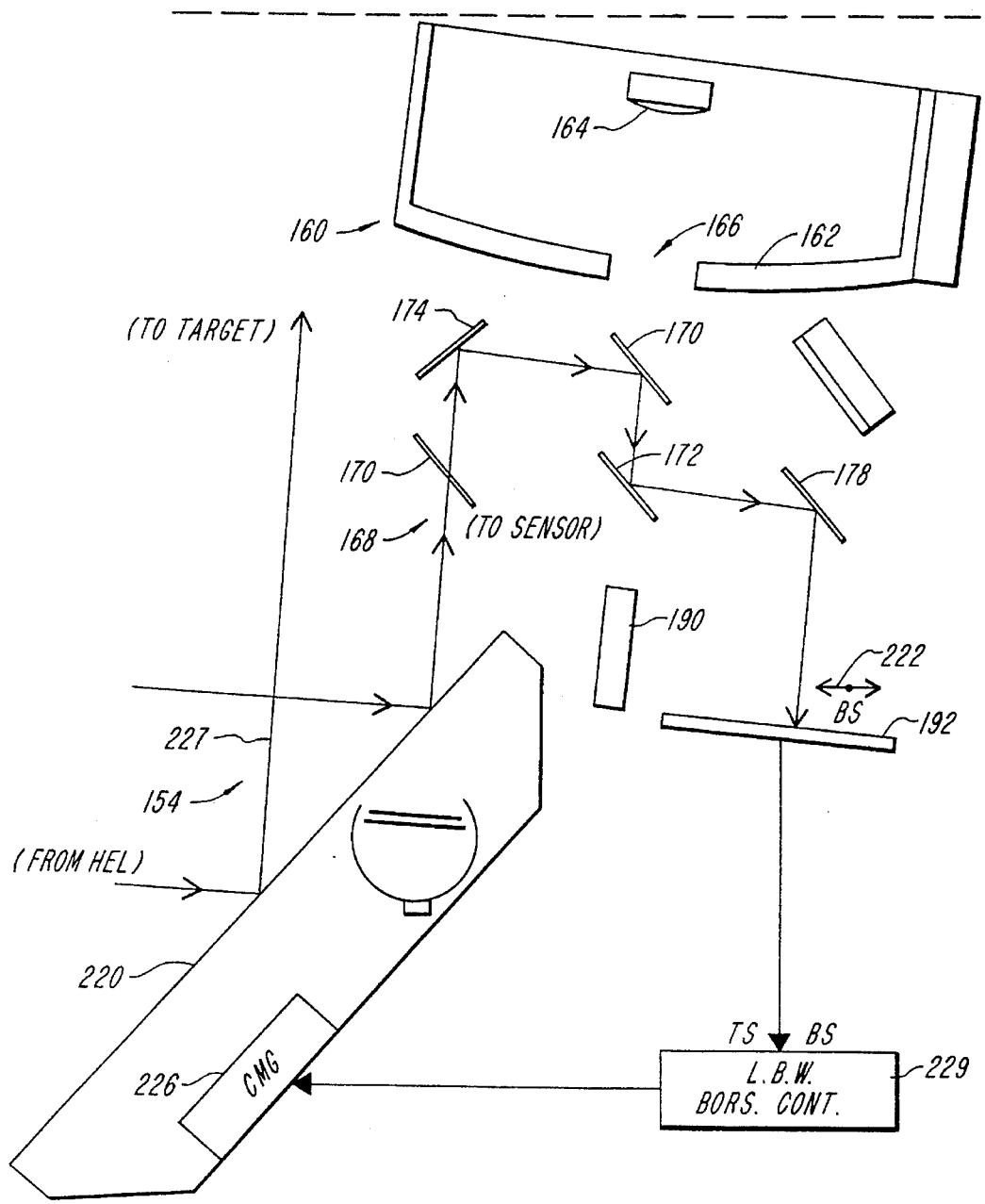

FIG. 8E illustrates one embodiment of a boresight transfer controller of the inertial target tracker according to the present invention. A mirror 220 illustrates the relay mirror of the associated tracker, whether at the earth station, the high altitude satellite, or the corresponding low earth target relay. The surface of the mirror 220 adjacent the optics module 168 is partially transmissive, to allow optical access to the inertially stabilized member 207, as described above in connection with the description of FIGS. 8B, 8D. For the trackers 144, 146 in FIG. 1, the associated mirrors are respectively responsive to the light from the laser beacons 222, 224. The laser beacon 222 is associated in FIG. 1 with the earth-bound station, and is as such not specifically illustrated. The corresponding beacon laser is deviated off the specular surface 220 of the associated tracker through the splitter 176 and onto the specular member 174. The specular member 174 deviates it to the beam splitter 170, a portion thereof is deviated thereoff onto the beam splitter 172. The beam splitter 172 deviates a portion thereof off the specular member 178 and onto the sensor 192 producing a spot designated "BS" representative thereof on the focal plane of the sensor. As the corresponding reflected laser beacon beam moves, the beacon spot moves accordingly, as illustrated by an arrow 222. A low bandwidth boresight controller 224 is connected to the output of the sensor 192 and to the input of a control moment gyro 226 designated "C.M.G." mounted to the associated relay mirror 220. The controller 224 is responsive to the centroid of the target spot image and to the centroid of the beacon spot image to so drive the C.M.G. 226 that the specular member 220 is angled to appropriately transfer the high-energy pulses 227 onto the corresponding target.

Figure 8F:
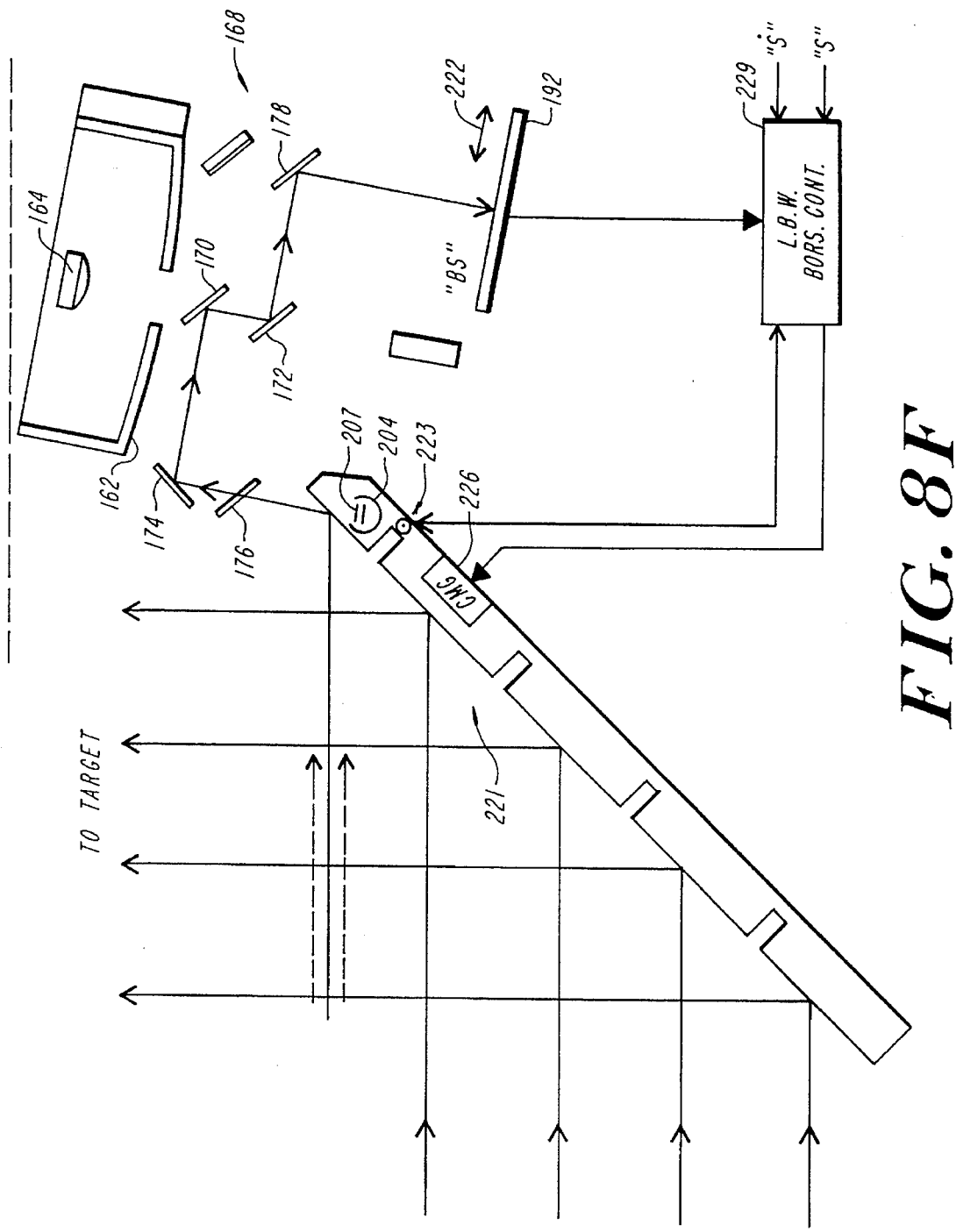

FIG. 8F illustrates another embodiment of a boresight transfer controller of the inertial target tracker able to provide boresight alignment over any alignment transfer angle of practicable interest and independantly of the field of view of the sensor 192. A segmented mission mirror generally designated 221 illustrates the relay or mission mirror of the associated tracker, whether at the earth station, the high altitude satellites, or the corresponding low earth orbit target relay satellites. In the illustrated embodiment, the mirror 221 is segmented into five parts, the four segments counted from the bottom of the figure upwardly being maintained in a co-planer relation by any suitable means, not shown. The fifth segment, adjacent the optics 168, is pivotably mounted to the segments maintained in co-planer relationship via a hinge generally designated 223. Any suitable means for controlling the position of the segment adjacent the optics 168 with respect to the position of the four mirror segments held in co-planer relation, such as the linear actuator 225 and linear strain gauge 227 illustrated in FIG. 12, may be employed without departing from the inventive concept.

Figure 12:
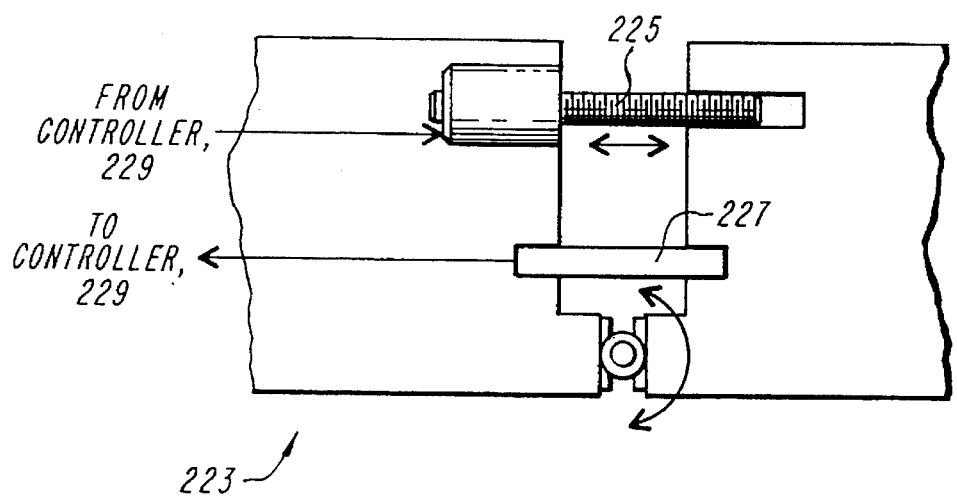
FIG. 12 is a blown-up pictorial view of a portion of a mission mirror having a controlled member.

The surface of the mirror segment of the mission mirror 221 adjacent the monolithic optics 168 is partially transmissive, to allow optical access to the inertially stabilized member 207, as described above in connection with the description of FIGS. 8B, 8D. For the trackers 144, 146 in FIG. 1, the associated mission mirrors are respectively responsive to the light from the laser beacons 222, 224. The laser beacon 222 is associated in FIG. 1 with the earth-bound station, and is, as such, not specifically illustrated. Of course, the tracker could as well respond to a precursor pulse, to the HEL itself, or to any other laser source representative of the pointing direction of the HEL laser without departing from the inventive concept. The corresponding beacon or other laser is deviated off the specular surface of the mirror segment adjacent the optics 168 of the associated tracker through the splitter 176 and onto the specular member 174. The specular member 174 deviates it to the beam splitter 170, and a portion thereof is deviated thereoff onto the beam splitter 172. The beam splitter 172 deviates a portion thereof off the specular member 178 and onto the sensor 192 producing a spot designated "BS" representative thereof on the focal plane and within the field of view and of the sensor. As the corresponding reflected laser beacon or other beam moves, the beacon spot moves accordingly, as illustrated by an arrow 222. A low bandwidth boresight controller 229 is connected to the output of the sensor 192, to the input of the control moment gyro 226 mounted to one of the segments of the mission mirror 221, to the input of the linear actuator 225, (FIG. 12) and to the output of the strain gauge 227 (FIG. 12). The controller 229 is responsive to the radial distance to the target designated "s", handed over to it from an intermediate field of view tracker, not shown, to the angular rate at which the target is moving designated "s°", to the beacon spot 3S, and to the target spot TS, not shown, to so angle the four co-planer segments of the mission mirror 221 via the CMG 226 as to both cause the high energy light to be deviated onto the projected space-time coordinates of the target object as well as to orient the mirror segment of the mission mirror 221 adjacent the optics 168 by that degree that brings the beacon spot into the field of view of the sensor 192. For a given predetermined positioning of the BS and TS on the sensor 192, the mirror segment adjacent the optics 168 is cocked in the preferred embodiment by an amount that corresponds to one half of the point ahead angle. Other mission mirrors capable of providing rapid re-targeting, such as bifocal, afocal, and other systems, not shown, can be employed as well without departing from the inventive concept.

Figure 8G:
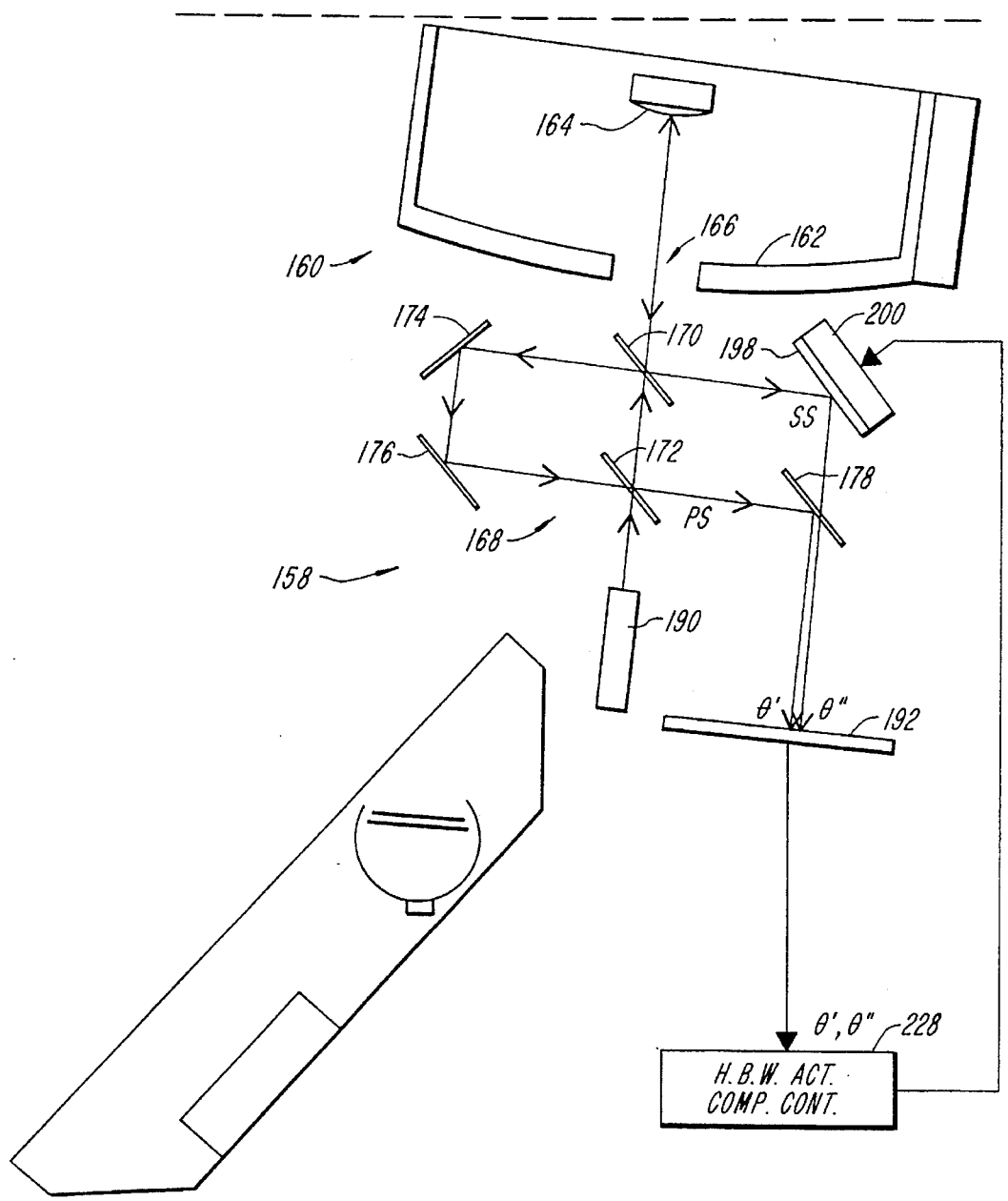

FIG. 8G illustrates the stabilization controller of the actuator 200 of the primary assembly of the inertial target tracker according to the present invention. The optical elements other than the secondary reflector 164 of the beam expander/compressor 160 are rigidly mounted to the primary reflector 162 of the beam expander/compressor, and are stabilized with respect to inertial space to compensate the undesirable effects of vibration and other noise as above described. Non-linearities in the actuator 200 are represented in the differential sensor positions of a secondary spot "θ'" and of an actuator nonlinearity reference spot designated "θ''". The spot θ' is produced on the focal plane of the sensor 192 by the laser beam of the laser 190 deviated thereonto along the optical path provided by the elements 172, 170, 174, 176, 172, and 178, which path does not "see" the actuator 198 as such. The spot θ" is produced on the focal plane of the sensor 192 by the laser beam of the laser 190 deviated thereonto along the optical path provided by the elements 164, 172, and 178. A controller 228 is connected between the output of the sensor 192 and the input of the X, Y tilt actuator 200. The controller 228 is operative in response to any deviation in the centroids of the energy of the θ' and the θ" images to compensate the actuator 198 for any nonlinearities in its performance.

The sizes of the several elements and apertures of the assembly 180, the size of the aperture 166 of the reflector 162 of the expander/compressor 160, and the dimensions of a pixel of the mosaic array are selected such that the spot sizes of the TS and of the PS are equal to each other and to the dimension of the pixels. This has been found to maximize the accuracy of spot centroid location determinations.

In operation, indirect coarse alignment is consistently and repeatedly maintained along the atmospheric uplink and space link portions of the ballistic missile destruction system. The coarse indirect uplink alignment subsystems described above in connection with the description of FIGS. 4 and 6 are responsive to the high altitude satellite beacon laser to keep the free electron laser boresighted to the relay mirror of the high altitude satellites and therewith the outgoing pulses aligned with the high altitude satellite relay mirror. The inertial target tracker on the high altitude satellite is responsive to the ground-based beacon laser and to each of the several low earth orbit satellite laser beacons as they respectively revolve into position over the launch corridor to keep the high altitude satellite relay mirror so angled as to be able to deviate high energy laser pulses received from the ground based laser onto the target relay mirror of the corresponding low earth orbit satellites.

In the event of a missile launch, missile neutralization critically depends on the precision with which the outgoing pulses of high energy laser light are capable of being aligned with respect to the structural shell of the attacking ballistic missiles. To provide direct boresight alignment, and therewith the requisite fine pointing accuracy, the free-electron laser is operative to provide precursor pulses that are deviated by the coarsely aligned mirrors up through the atmospheric uplink towards the high altitude satellite. The precursor pulses are selected to have a duty cycle that maximizes visibility by the tracker selected. The precursor pulses heat the molecules of the atmosphere along the uplink and downlink producing therealong a thermal gradient having the characteristics of a negative optical lens. The incoming and outgoing energy along the uplink and along the downlink traverse the reciprocal optical path, and are subject to the same negative optical lens (blooming).

Referring now to FIG. 10A, generally designated at 228 is a pictorial diagram illustrating the case of direct boresight alignment of the outgoing and return energy along the atmospheric uplink. The precursor pulse represented by an annulus 232 and a high altitude laser beacon represented by a column 230 are coaxially aligned, and the incoming beacon laser everywhere traverses the same regions of the bloomed medium. The negative optical lens symmetrically diverges the high altitude laser beacon producing a symmetrical generally donut-shaped sensor image thereof indicative of very precise boresight alignment of the outgoing precursor pulses with the beacon laser.

Referring now to FIG. 10B, generally designated at 234 is a pictorial diagram illustrating the case of relative coaxial misalignment of the outgoing and return energy along the atmospheric uplink. The outgoing precursor pulses are represented by beam 238 and the high altitude beacon laser return is represented by a beam 236. In this case, the outgoing and incoming energy traverse different thermal regions of the thermal gradient defining the negative optical lens of the blooming medium, so that the high altitude beacon laser return is asymmetrically distorted and is diverged a large number multiple of the actual relative coaxial misalignment, as schematically illustrated by the generally kidney-shaped sensor image of the incoming energy 236. The shape and position of the sensor image thereof provides an extremely sensitive indication of the degree and sense of relative coaxial alignment. Along the downlink, the same principle provides direct boresight blooming autocollimation alignment of the vacuum core plume emission of the ballistic missile and the precursor pulses respectively as the incoming and return energy. Reference may be had in this connection to commonly assigned U.S. Pat. No. 4,571,076, entitled "BLOOMING AUTO COLLIMATOR", incorporated herein by reference.

Referring now to FIG. 11, generally designated at 240 is a pictorial view illustrating lead angles for final target lock on. An aim point offset designated "α" is provided between the line of sight to the vacuum core plume designated by a circle 242 and an aim point on the structural portion of the missile booster designated by a circle 244. All aim point offset designated "β" is provided between the target aim point 244 and the future angular position of the missile projected at the time of interception by the high energy light pulses. A combined offset equal to the sum of "α" and "β" is added to the coordinates of the ballistic missile as determined by the finely boresighted inertial target tracker, and the outgoing pulses lock-on to the target aim point. The precursor/full power pulse process is repeated until the missile is destroyed as verified by the vacuum core plume image, and if it escapes, its inertial coordinates as handed-down to the next defensive layer.

Many modifications of the presently disclosed invention are possible to those skilled in the art without departing from the scope of the appended claims.

What is claimed is:

1. Alignment transfer apparatus for orientating a mission mirror having an optical aperture in such a way that a high energy laser incident to the optical aperture of the mission mirror is boresighted directly onto a moving target object by deviation off of the mission mirror, comprising:

directional means for gathering light energy representative of the target object within a field of view and for controllably orientating its field of view in space to track the target object within its field of view in response to a tracking control signal;

optical means for imaging light energy representative of the target object gathered within the field of view of the directional means as a sensible spot of light energy within a focal plane that corresponds to the target object and that moves within the focal plane as the target object moves within space, and that has positional uncertainty within the focal plane limited by noise;

inertial reference means including an inertially stable reference and an alignment laser providing an alignment laser beam cooperative with the optical means and responsive to the alignment laser beam for providing a sensible spot of inertially-stabilized alignment laser energy within the same focal plane;

a high bandwidth sensor capable of resolving multiple spots positioned within the same focal plane;

first controller means coupled to the sensor and responsive to the sensible spot of inertially stabilized alignment laser energy for inertially stabilizing the sensible spot of light energy corresponding to the target object against noise;

second controller means coupled to the sensor and responsive to the inertially-stabilized sensible spot of light energy corresponding to the target object for providing said tracking control signal;

means associated with the mission mirror and cooperative with the optical means for providing a sensible spot of light energy on the focal plane and within the field of view of the sensor representative of pointing direction of the high energy laser in response to light energy received within the optical aperture of the mission mirror representative of the pointing direction of the high energy laser; and third controller means coupled to the mission mirror and responsive to the sensible spot of inertially stabilized alignment laser energy and to the sensible spot of light energy representative of pointing direction of the high energy laser for so orientating the mission mirror that the high energy laser incident to the optical aperture thereof is boresighted directly onto the moving target object.

2. The invention of claim 1, wherein the mission mirror is a monocle, and wherein said means associated with the mission mirror and cooperative with the optical means for providing a sensible spot of light energy on the focal plane and within the field of view of the sensor representative of pointing direction of the high energy laser in response to light energy received within the optical aperture of the mission mirror representative of the pointing direction of the high energy laser is a part of the monocle mission mirror.

3. The invention of claim 1, wherein the mission mirror includes multiple planar segments, and wherein the means associated with the mission mirror and cooperative with the optical means for providing a sensible spot of light energy on the focal plane and within the field of view of the sensor representative of pointing direction of the high energy laser in response to light energy received within the optical aperture of the mission mirror representative of the pointing direction of the high energy laser includes one of the segments of the mission mirror and further includes means for controllably orientating said one of the segments of the mission mirror with respect to the remaining segments of the mission mirror.

4. The invention of claim 1, wherein said directional means includes a telescope.

5. The invention of claim 4, wherein said optical means includes monolithic optics hard-mounted to said telescope.

6. The invention of claim 1, wherein said inertially stable reference includes a specular member mounted thereto for deviating said alignment laser beam thereoff.

7. The invention of claim 1, wherein said high bandwidth sensor includes a mosaic array sensor.

8. The invention of claim 7, wherein said mosaic array sensor has a quad cell superimposed thereon.

9. The invention of claim 1, wherein said optical means includes a controlled optical element, wherein said first controller controllably orientates the controlled optical element for inertially stabilizing the sensible spot of light energy corresponding to the target object against noise, and further including fourth controller means coupled to the controlled optical element for stabilizing the same against noise.

10. The invention of claim 4, wherein said telescope is a beam expander having a two-degree of freedom actuator mounted thereto, and wherein said second controller means couples said tracking control signal to said two-degree of freedom actuator thereof.

11. Apparatus remote from a moving targeted object providing the space-time position and angular rate coordinates of the moving targeted object with respect to inertial space and providing boresight alignment transfer of a beam of directed energy received from a remote source at that point ahead angle that allows the beam of directed energy to impact the moving targeted object, comprising:

sighting means for optically sighting targeted objects;

a sensor having a field of view and a focal plane;

optical means cooperative with and optically coupled to the sighting means and the sensor for imaging targeted objects sighted by the sighting means as corresponding target spots on the focal plane and within the field of view of the sensor along a first optical path having noisy optical elements therealong;

inertial reference means for providing a pseudo-star reference at rest with respect to inertial space and cooperative with the optical means for imaging the pseudo-star reference as a spot on the focal plane and within the field of view of the sensor along a second optical path that includes at least a portion of the first optical path and having therealong at least some of the same noisy optical elements;

noise cancellation controller means coupled to the optical means and to the sensor, and responsive to the pseudo-star spot, for stabilizing the target spots against noise introduced by the noisy optical elements;

tracking controller means coupled to the sighting means and to the sensor for positionally stabilizing the noise-stabilized target spots by causing the sighting means to track the targeted objects;

angular rate controller means coupled to the inertial reference means and to the sensor for providing signals representative of angular rate of the targeted objects with respect to inertial space by positionally stabilizing the pseudo-star spot on the sensor;

a boresight alignment transfer member orientatable at a point-ahead angle;

alignment transfer controller means coupled to the sensor and cooperative with both the boresight alignment transfer member and with the imaging means and responsive to a beam representative of the pointing direction of the beam of directed energy for providing a boresight transfer spot on the focal plane and within the field of view of the sensor representative of the pointing direction of the beam of directed energy and responsive to the signals representative of angular rate of the targeted objects, to a signal representative of range to the targeted objects, and to the boresight transfer spot for orienting the boresight alignment transfer member at that point-ahead angle that allows the beam of directed energy to impact the moving targeted objects.

12. The invention of claim 11, wherein the boresight alignment transfer member includes a first specular member and a second specular member, and means for orientating the second specular member relative to the first specular member, said second specular member responsive to said beam representative of the pointing direction of the beam of directed energy and cooperative with said optical means for providing and boresight transfer spot on said sensor, said orientating means responsive to said boresight transfer spot for orientating the first specular member at that point-ahead angle that allows the beam of directed energy to impact the moving targeted object.

13. The invention of claim 11, wherein said sighting means includes a beam expander for providing magnification of the position of target objects sighted thereby.

14. The invention of claim 11, wherein said sensor includes a high bandwidth multiple spot mosaic array.

15. The invention of claim 13, wherein said optical means includes monolithic optics mounted to said beam expander in a hard-mounted fashion.

16. The invention of claim 11, wherein said inertial reference means includes an alignment laser providing an alignment laser beam, and a specular member mounted to said pseudo-star reference.

17. The invention of claim 15, wherein said optical means further includes a controllably orientatable specular member cooperative with the monolithic optics, and wherein said noise cancellation controller means is coupled to the controllably orientable specular member for so controlling it that the target spots are stabilized against noise on the sensor.

18. The invention of claim 17, further including means cooperative with the sensor and coupled to the controllably orientable specular member for calibrating the controllably orientatable specular member for noise.

19. The invention of claim 13, further including an actuator coupled to said beam expander and responsive to said tracking controller means for causing the sighting means to track the moving targeted objects.

20. The invention of claim 16, wherein said pseudo-star reference having said specular member has a pulse torque input, and wherein said signals representative of angular rate of the moving targeted objects is the frequency at which the input to the pulse torque input stabilizes the pseudo-star spot on the sensor.

21. The invention of claim 11, wherein said boresight alignment transfer member includes a mission mirror.

22. The invention of claim 21, wherein said mission mirror is planer.

23. The invention of claim 22, wherein said planer mission mirror is segmented.

24. The invention of claim 21, wherein said mission mirror is afocal.

25. The invention of claim 21, wherein said mission mirror is bifocal.

26. Apparatus for providing high-accuracy boresight alignment of bursts of very high power laser light originating from an earth station with a photon-limited ballistic missile in its boost phase originating from a region of the earth remote from the earth station through the atmosphere along an uplink optical path defined between a relay mirror of a high altitude satellite moving with predetermined velocities and having predetermined distances with respect to the earth station and source of the bursts of very high power laser light, through near-earth-space along a space link defined between the high altitude satellite relay mirror and a relay mirror of a low earth orbit target satellite over a ballistic missile launch corridor, and through the atmosphere along a downlink defined between the low earth orbit target satellite relay mirror and said ballistic missile in its boost phase wherein means are associated with the high altitude satellite for providing a laser beam directed along the uplink optical path towards the earth station that is representative of the position of the high altitude satellite relay mirror said laser beam and said source directed along said uplink optical path are offset with preselected aim-point lead angles selected such that the source and laser beam taking into account said propagation velocities and distances traverse substantially the same column of atmosphere, comprising:

- laser separator means defining an optical aperture associated with the earth station and positioned along said uplink optical path for both receiving said laser beam associated with said high altitude satellite at said optical aperture and for transmitting said bursts of said very high power laser light through said optical aperture;
- means associated with said earth station for providing a first control signal representative of the pointing direction of the source of the bursts of the very high power laser light;
- means associated with said earth station and optically coupled to said optical aperture of said laser separator means and responsive to the received laser beam associated with said high altitude satellite at said optical aperture for providing a second control signal representative of the position of the relay mirror of the high altitude satellite;
- means responsive to said first and to said second control signals for providing a third control signal representative of the degree of misalignment of the bursts of the source at the earth station with the position of the relay mirror of the high altitude satellite; and
- means associated with the earth station and responsive to the third control signal for aligning the pointing direction of the bursts with the position of the high altitude satellite relay mirror;
- whereby the bursts and the laser beam in traversing the uplink path substantially reciprocally through the atmosphere thereby undergo substantially self-cancelling atmospheric medium induced effects.

27. The system of claim 26, further including a beam expander having an input and an output associated with the earth station and positioned along the atmospheric uplink path, and wherein said laser separator means is positioned between said source and said input of said beam expander.

28. The invention of claim 26, further including a beam expander having an input and output positioned along the atmospheric uplink path, and wherein said laser separator means is positioned along said uplink optical path at the output of said beam expander.

29. The invention of claim 26, further including a beam amplifier and expander associated with said earth station including an input reflector and an output reflector, and wherein said laser separator means is positioned intermediate said input reflector and said output reflector of said beam amplifier and expander.

30. The invention of claim 27, wherein said laser separator includes an apertured spinning disk at least one of the opposed surfaces of which is highly polished to provide a specular surface.

31. The invention of claim 28, wherein said separator includes an apertured spinning disk at least one of the opposing surfaces of which is highly polished to provide a specular surface.

32. The invention of claim 29, wherein said laser separator includes an apertured spinning disk at least one of the opposing surfaces of which is highly polished to provide a specular surface.

33. The invention of claim 26, wherein said first control signal providing means includes a sensor and optics for imaging bursts of laser light from the high energy laser onto the sensor as a spot, and further includes means responsive to centroid position of said spot on said sensor to provide said first control signal.

34. The invention of claim 26, wherein said second control signal providing means includes a sensor and means coupled to said optical aperture for imaging the beacon laser beam on said sensor as a spot, and further including means responsive to centroid position as well as to spot shape of said spot on said sensor to provide said second control signal.

35. A method for boresight aligning a relay mirror of a high altitude satellite moving with predetermined velocities with a high energy laser of an earth based station, said high altitude satellite having predetermined positions with respect to said earth station comprising the steps of:

- directing a beam of laser light representative of the pointing direction of the high energy laser from the earth based station upwardly towards the high altitude satellite along an optical path through the atmosphere and to the high altitude satellite;
- directing a beacon laser beam representative of the position of the relay mirror of the high altitude satellite from the high altitude satellite towards the earth based station;
- offsetting the beacon laser beam and the beam of laser light with preselected aimpoint lead angles selected such that the source and laser beam taking into account said propagation velocities and distances traverse substantially the same path as the upwardly directed beam of laser light at least along that part of the optical path thereof where the beacon laser beam traverses the atmosphere;
- measuring at the earth based station the location and shape of sensor images of the earth directed beam on a sensor at the earth station; and
- correcting the pointing direction of the high energy laser of the earth based station in response to the measured location and shape of the sensor images of the earth based station directed beacon laser beam.

36. An inertial target tracker for providing the space-time angular rate coordinates with respect to absolute interial space of an object in inertial space remote from the tracker with an ultra-high resolution accuracy, comprising:

- a mosaic array sensor composed of plural pixels each of preselected dimension and defining a focal plane;
- first means including primary and secondary reflectors defining a field of view and a selected magnification M;
- second means coupled to said first means for imaging a target within the field of view of the first means as a target spot on the focal plane of the sensor and in such a way that a change Θ of position of the target in inertial space manifests as a change MΘ in position of the target spot on the focal plane of the sensor;

a pseudo-star reference at rest with respect to inertial space;

third means including a laser cooperative with said second means for imaging the pseudo-star reference as a pseudo-star spot on the focal plane of the sensor;

said target spot on said sensor having a preselected size, and said pseudo-star spot on the focal plane of said sensor having a preselected size, said sizes being selected to be substantially equal to said preselected pixel dimension of said pixels of said sensor;

first control means responsive to positional changes of the pseudo-star spot on the focal plane of the sensor for stabilizing the target spot so that the position of the target spot on the sensor thereby is representative of the position of the target in inertial space;

second control means responsive to the positional changes of the target spot on the sensor for so moving said first, second, and third means as to track the movement of the target in inertial space; and third control means responsive to the positional changes of the pseudo-star spot and to said movement of said first, second, and said third means for measuring the angular rate of the target with respect to inertial space.

37. The invention of claim 36, wherein said first means includes a beam expander including said primary and secondary reflectors.

38. The invention of claim 37, wherein said second means includes monolithic optics rigidly fastened to said primary reflector of said beam expander.

39. The invention of claim 37, wherein said pseudo-star reference includes an inertially stabilized specular member.

40. The invention of claim 39, wherein said first control means includes means for stabilizing said secondary with respect to said primary reflector, and for stabilizing said primary reflector with respect to inertial space.

41. The invention of claim 39, wherein said second control means includes means responsive to said pseudo-star spot for moving said beam expander at a rate that corresponds to the rate at which the target moves in inertial space.

42. The invention of claim 41, wherein said third means includes means for so moving the inertially stabilized specular member that the pseudo-star spot on the focal plane of the sensor is held stationary.

43. The invention of claim 36, wherein said spots have a common wavelength, and said sensor is a narrowband sensor tuned to the common wavelength so that background noise in different spectral regions are rejected.

44. A boresight and inertial tracking system for a ballistic missile destruction system including an earth station having a ground based high energy laser providing an outgoing beam, and a high altitude satellite moving with predetermined velocities and distances with respect to said earth station and having a relay mirror and a beacon laser, said high energy laser and said beacon laser being in confronting relation and respectively providing outgoing and incoming energy that are offset with preselected aimpoint lead angles selected such that the source and beacon laser taking into account said propagation velocities and distances traverse substantially the same column of atmosphere comprising:

atmospheric uplink indirect alignment means including a laser separator having an optical aperture for aligning at said optical aperture common wavelength outgoing and incoming beams representative respectively of pointing direction of said ground based high energy laser and position of said high altitude satellite relay mirror;

atmospheric uplink direct alignment means operative in response to said incoming beam to provide direct boresight blooming autocollimation of the pointing direction of the outgoing beam;

spacelink alignment transfer means including an inertial tracker having a narrow spectral response sensor tuned to said common wavelength for providing the space-time coordinates of a low altitude target relay mirror associated with a low altitude satellite remote from the inertial tracker and for transferring the energy incident of the high altitude satellite relay mirror of the low altitude satellite; and atmospheric downlink indirect alignment means including an inertial tracker having a narrow spectral response sensor tuned to said common wavelength associated with said low altitude satellite for providing space-time coordinates of an aimpoint of a ballistic missile in flight remote from the inertial tracker, and for transferring the energy incident on the low altitude target relay mirror towards and onto the space-time coordinates of the ballistic missile aimpoint.

45. The system of claim 44, wherein the ballistic missile has a photon limited vacuum core spectral line emission having a wavelength, and wherein said common wavelength is selected to be equal to the wavelength of said vacuum core line emission of the ballistic missile.

46. The system of claim 44, further including atmospheric downlink direct alignment means operative in response to the photon limited line emission of the vacuum core plume of said ballistic missile to provide fine direct blooming autocollimation of the pointing direction of the target relay mirror.

47. The system of claim 44, wherein said laser separator includes a spinning apertured metallic disk having at least one highly polished specular surface.

48. The system of claim 44, wherein said sensor includes a mosaic array sensor.

49. Apparatus for providing high-accuracy boresight alignment of bursts of very high power laser light originating from an earth station with a photon-limited ballistic missile in its boost phase originating from a region of the earth remote from the earth station through the atmosphere along an uplink optical path defined between a relay mirror of a high altitude satellite, moving with predetermined velocities and having predetermined distances with respect to the earth station, and source of the bursts of very high power laser light, through near-earth-space along a space link defined between the high altitude satellite relay mirror and a relay mirror of a low earth orbit target satellite over a ballistic missile launch corridor, and through the atmosphere along a downlink defined between the low earth orbit target satellite relay mirror and said ballistic missile in its boost phase wherein means are associated with the high altitude satellite for providing a laser beam directed along the uplink optical path towards the earth station that is representative of the position of the high altitude satellite relay mirror, said laser beam and said source directed along said uplink optical path are offset with preselected aimpoint lead angles selected such that the source and laser beam taking into account said propagation velocities and distances traverse substantially the same column of atmosphere, comprising:

means including an alignment laser associated with said earth station for providing a first control signal representative of the pointing direction of the source of the bursts of the very high power laser light;

laser separator means defining an optical aperture associated with the earth station and positioned along said uplink optical path for both receiving said laser beam associated with said high altitude satellite at said optical aperture and for transmitting said bursts of said very high power laser light through said optical aperture;

means associated with said earth station and optically coupled to said optical aperture of said laser separator means and responsive to the received laser beam associated with said high altitude satellite at said optical aperture for providing a second control signal representative of the position of the relay mirror of the high altitude satellite;

means responsive to said first and to said second control signals for providing a third control signal representative of the degree of misalignment of the bursts of the source at the earth station with the position of the relay mirror of the high altitude satellite; and means associated with the earth station and responsive to the third control signal for aligning the pointing direction of the bursts with the position of the high altitude satellite relay mirror;

whereby the bursts and the laser beam in traversing the uplink path substantially reciprocally through the atmosphere thereby undergo substantially self-cancelling atmospheric medium induced effects.

50. Apparatus for providing high-accuracy boresight alignment of bursts of very high power laser light originating from an earth station with a photon-limited ballistic missile in its boost phase originating from a region of the earth remote from the earth station through the atmosphere along an uplink optical path defined between a relay mirror of a high altitude satellite moving with predetermined velocities and having predetermined distances with respect to the earth station and source of the bursts of very high power laser light, through near-earth-space along a space link defined between the high altitude satellite relay mirror and a relay mirror of a low earth orbit target satellite over a ballistic missile launch corridor, and through the atmosphere along a downlink defined between the low earth orbit target satellite relay mirror and said ballistic missile in its boost phase wherein means are associated with the high altitude satellite for providing a laser beam directed along the uplink optical path towards the earth station that is representative of the position of the high altitude satellite relay mirror, said laser beam and said source directed along said uplink optical path are offset with preselected aimpoint lead angles selected such that the source and laser beam taking into account said propagation velocities and distances traverse substantially the same column of atmosphere, comprising:

laser separator means including a spinning apertured specular member having at least one aperture and defining an optical aperture that is associated with the earth station and positioned along said uplink optical path for both receiving said laser beam associated with said high altitude satellite at said optical aperture and for transmitting said bursts of said very high power laser light through said optical aperture;

means associated with said earth station for providing a first control signal representative of the pointing direction of the source of the bursts of the very high power laser light;

means associated with said earth station and optically coupled to said optical aperture to said laser separator means and responsive to the received laser beam associated with said high altitude satellite at said optical aperture for providing a second control signal representative of the position of the relay mirror of the high altitude satellite;

means responsive to said first and to said second control signals for providing a third control signal representative of the degree of misalignment of the bursts of the source at the earth station with the position of the relay mirror of the high altitude satellite;

means associated with the earth station and responsive to the third control signal for aligning the pointing direction of the bursts with the position of the high altitude satellite relay mirror;

the bursts of very high power laser light have a preselected wavelength, the laser beam provided by the means associated with the high altitude satellite has a preselected wavelength, the wavelengths of the bursts of very high power laser light and the wavelengths of the laser beam being selected to be substantially the same wavelength;

whereby the bursts and the laser beam in traversing the uplink path substantially reciprocally through the atmosphere and thereby undergo substantially self-cancelling atmospheric medium induced effects.

51. Apparatus for providing high-accuracy boresight alignment of bursts of very high power laser light originating from an earth station with a photon-limited ballistic missile in its boost phase originating from a region of the earth remote from the earth station through the atmosphere along an uplink optical path defined between a relay mirror of a high altitude satellite moving with predetermined velocities and having predetermined distances with respect to the earth station and source of the bursts of very high power laser light, through near-earth-space along a space link defined between the high altitude satellite relay mirror and a relay mirror of a low earth orbit target satellite over a ballistic missile launch corridor, and through the atmosphere along a downlink defined between the low earth orbit target satellite relay mirror and said ballistic missile in its boost phase wherein means are associated with the high altitude satellite for providing a laser beam directed along the uplink optical path towards the earth station that is representative of the position of the high altitude satellite relay mirror said laser beam and said source directed along said uplink optical path are offset with preselected aimpoint lead angles selected such that the source and laser beam taking into account said propagation velocities and distances traverse substantially the same column of atmosphere, comprising:

means including an alignment laser associated with said earth station for providing a first control signal representative of the pointing direction of the source of the bursts of the very high power laser light;

laser separator means including a spinning apertured specular member having at least one aperture and defining an optical aperture that is associated with the earth station and positioned along said uplink optical path for both receiving said laser beam associated with said high altitude satellite at said optical aperture and for transmitting said bursts of said very high power laser light through said optical aperture;

means associated with said earth station for providing a first control signal representative of the pointing direction of the source of the bursts of the very high power laser light;

means associated with said earth station and optically coupled to said optical aperture to said laser separator means and responsive to the received laser beam associated with said high altitude satellite at said optical aperture for providing a second control signal representative of the position of the relay mirror of the high altitude satellite;

means responsive to said first and to said second control signals for providing a third control signal representative of the degree of misalignment of the bursts of the source at the earth station with the position of the relay mirror of the high altitude satellite;

means associated with the earth station and responsive to the third control signal for aligning the pointing direction of the bursts with the position of the high altitude satellite relay mirror;

the bursts of very high power laser light have a preselected wavelength, the laser beam provided by the means associated with the high altitude satellite has a preselected wavelength, the wavelengths of the bursts of very high power laser light and the wavelengths of the laser beam being selected to be substantially the same wavelength;

whereby the bursts and the laser beam in traversing the uplink path substantially reciprocally through the atmosphere and thereby undergo substantially self-cancelling atmospheric medium induced effects.

52. An inertial target tracker for tracking a target object in inertial space remote from the tracker with an ultra-high resolution accuracy, comprising:

a sensor;

first means for providing a field of view;

second means coupled to said first means for imaging the target object within the field of view of the first means as a target spot on the sensor;

a pseudo-star reference at rest with respect to inertial space;

third means including a laser cooperative with said second means for imaging the pseudo-star reference as a pseudo-star spot on the sensor; and control means responsive to positional changes of the pseudo-star spot on the sensor for stabilizing the target spot against vibration and other noise so that the position of the target spot on the sensor is thereby representative of the position of the target with respect to inertial space.

53. An inertial target tracker for tracking a target object in inertial space remote from the tracker with an ultra-high resolution accuracy, comprising:

a sensor;

first means for providing a field of view;

second means coupled to said first means for imaging the target object within the field of view of the first means as a target spot on the sensor;

a pseudo-star reference at rest with respect to inertial space;

third means including a laser cooperative with said second means for imaging the pseudo-star reference as a pseudo-star spot on the sensor;

control means responsive to positional changes of the pseudo-star spot on the sensor for stabilizing the target spot against vibration and other noise so that the position of the target spot on the sensor is thereby representative of the position of the target with respect to inertial space;

means responsive to the position of the target spot for moving the field of view providing means in response to motion of the target object in order to maintain the target spot in a temporally stable position on the sensor; and means responsive to the movement of the pseudo-star spot on the sensor for calculating the angular velocity of the target object with respect to inertial space.

54. A boresight and inertial tracking system for a ballistic missile destruction system including an earth station having a ground based high energy laser providing an outgoing beam, and a high altitude satellite moving with predetermined velocities and distances with respect to said earth station and having a relay mirror and a beacon laser, said high energy laser and said beacon laser being in confronting relation and respectively providing outgoing and incoming energy that are offset with preselected aimpoint lead angles selected such that the source and beacon laser taking into account said propagation velocities and distances traverse substantially the same column of atmosphere, comprising:

atmospheric uplink indirect alignment means including a laser separator having an optical aperture for aligning at said optical aperture common wavelength outgoing and incoming beams representative respectively of pointing direction of said ground based high energy laser and position of said high altitude satellite relay mirror;

atmospheric uplink direct alignment means operative in response to said incoming beam to provide direct boresight blooming autocollimation of the pointing direction of the outgoing beam; and spacelink alignment transfer means including an inertial tracker having a narrow spectral response sensor tuned to said common wavelength for providing the space-time coordinates of a low altitude target relay mirror associated with a low altitude satellite remote from the inertial tracker and for transferring the energy incident on the high altitude satellite relay mirror from the high energy laser towards and onto the space-time coordinates of the target relay mirror of the low altitude satellite;

said ballistic missile has a photon limited vacuum core spectral line emission having a wavelength, and wherein said common wavelength is selected to be equal to the wavelength of said vacuum core line emission of the ballistic missile.

* * * * *

UNITED STATES PATENT AND TRADEMARK OFFICE
CERTIFICATE OF CORRECTION

PATENT NO. : 5,557,347

DATED : September 17, 1996

INVENTOR(S) : William M. Johnson

It is certified that error appears in the above-identified patent and that said Letters Patent is hereby corrected as shown below:

Column 2, line 10, "arid boresight" should read --and boresight--.

Column 6, line 3, "missiles" should read --missiles'--.

Column 13, line 21, "reflect or 174" should read --reflector 174--.

Column 15, line 64, ""S°"," should read --"$\overset{8}{S}$",--.

Column 15, line 65, "spot 3S," should read --spot BS,--.

Column 17, line 48, "All aim point" should read --An aim point--.

Signed and Sealed this

Eighth Day of September, 1998

Attest:

BRUCE LEHMAN

Attesting Officer

Commissioner of Patents and Trademarks